United States Patent
Mori et al.

(10) Patent No.: US 7,166,339 B1
(45) Date of Patent: Jan. 23, 2007

(54) PHASE CONTRAST PLATE COMPRISING ONE SHEET OF CELLULOSE ESTER FILM CONTAINING AROMATIC COMPOUND

(76) Inventors: Hiroyuki Mori, c/o Fuji Photo Film Co., Ltd., No. 210, Nakanuma, Minami-ashigara-shi, Kanagawa, 250-0123 (JP); Hiroaki Sata, c/o Fuji Photo Film Co., Ltd., No. 210, Nakanuma, Minami-ashigara-shi, Kanagawa, 250-0123 (JP)

( * ) Notice: Subject to any disclaimer, the term of this patent is extended or adjusted under 35 U.S.C. 154(b) by 0 days.

(21) Appl. No.: 09/959,128

(22) PCT Filed: Apr. 21, 2000

(86) PCT No.: PCT/JP00/02619

§ 371 (c)(1),
(2), (4) Date: Oct. 22, 2001

(87) PCT Pub. No.: WO00/65384

PCT Pub. Date: Nov. 2, 2000

(30) Foreign Application Priority Data

| Apr. 21, 1999 | (JP) | ............................................ 11/113617 |
| Feb. 23, 2000 | (JP) | ........................................ 2000/045629 |
| Feb. 23, 2000 | (JP) | ........................................ 2000/045630 |

(51) Int. Cl.
*G02F 1/1335* (2006.01)

(52) U.S. Cl. ..................... 428/1.33; 428/1.31; 349/117; 349/118; 349/96

(58) Field of Classification Search ................ 428/1.31, 428/1.33; 349/117, 118, 96, FOR. 116
See application file for complete search history.

(56) References Cited

U.S. PATENT DOCUMENTS 3,912,369 A * 10/1975 Kashnow .............. 350/160 LC 5,583,679 A 12/1996 Ito et al.
6,476,892 B1 * 11/2002 Aminaka .................... 349/117

FOREIGN PATENT DOCUMENTS

| EP | 0 928 984 A2 | 7/1999 |
| JP | 3-33719 | 2/1991 |
| JP | 6-167612 | 6/1994 |
| JP | 7-218724 | 8/1995 |
| JP | 9-297216 | 11/1997 |
| JP | 10-68816 | 3/1998 |
| JP | 10-90521 | 4/1998 |
| JP | 0911656 A2 * | 10/1998 |
| JP | 11-5851 | 1/1999 |
| JP | 11-92574 | 8/1999 |
| JP | 2000-111914 | 4/2000 |
| JP | 2000-137116 | 5/2000 |

OTHER PUBLICATIONS

International Search Report of PCT/JP00/02619.

* cited by examiner

*Primary Examiner*—Harold Pyon
*Assistant Examiner*—Sow-Fun Hon

(57) ABSTRACT

A phase retarder comprises one cellulose ester film. The retardation value of the film represented by Re450 measured at the wavelength of 450 nm is in the range of 100 to 125 nm. The retardation value of the film represented by Re590 measured at the wavelength of 590 nm is in the range of 120 to 160 nm. The retardation values represented by Re450 and Re590 satisfy the condition of Re590−Re450≧2 nm. An aromatic compound having at least two aromatic rings is incorporated in the film as a retardation increasing agent to obtain $\lambda/4$ in the wide wavelength region defined above. A phase retarder can also give $\lambda/2$ in a wide wavelength region in the same manner.

18 Claims, 1 Drawing Sheet

US 7,166,339 B1

PHASE CONTRAST PLATE COMPRISING ONE SHEET OF CELLULOSE ESTER FILM CONTAINING AROMATIC COMPOUND

FIELD OF THE INVENTION

The present invention relates to a phase retarder comprising one cellulose ester film containing an aromatic compound, and a circularly polarizing plate using the phase retarder.

BACKGROUND OF THE INVENTION

Quarter-wave ($\lambda/4$) plates and half-wave ($\lambda/2$) plates are widely and practically used in the field of antireflection films and liquid crystal displays. Most $\lambda/4$ plates and $\lambda/2$ plates give $\lambda/4$ and $\lambda/2$ only at certain wavelengths, respectively.

Japanese Patent Provisional Publication Nos. 5(1993)-27118 and 5(1993)-27119 disclose a phase retarder comprising a birefringent film having high retardation and another birefringent film having low retardation. The birefringent films are laminated so that their optical axes may be perpendicularly crossed. If the difference of the retardation between the two films is $\lambda/4$ or $\lambda/2$ in the whole visible wavelength region, the phase retarder theoretically serves as a $\lambda/4$ or $\lambda/2$ plate in the whole visible wavelength region, respectively.

Japanese Patent Provisional Publication No. 10(1998)-68816 discloses a phase retarder comprising laminated two polymer films made of the same material. Each of the films gives $\lambda/2$ at a certain wavelength, and thereby the phase retarder gives $\lambda/4$ in a wide wavelength region.

Japanese Patent Provisional Publication No. 10(1998)-90521 also discloses a phase retarder comprising laminated two polymer films. This phase retarder also gives $\lambda/4$ in a wide wavelength region.

As the polymer films in the above phase retarders, stretched films of synthetic polymers such as polycarbonate are used.

SUMMARY OF THE INVENTION

A phase retarder comprising laminated two polymer films gives $\lambda/4$ or $\lambda/2$ in a wide wavelength region. However, in that phase retarder, the two polymer films must be laminated so that the angle between them be strictly adjusted.

An object of the present invention is to provide a phase retarder comprising one polymer film giving $\lambda/4$ or $\lambda/2$ in a wide wavelength region.

The invention provides a phase retarder comprising one cellulose ester film, wherein a retardation value of the film represented by Re450 measured at the wavelength of 450 nm is in the range of 100 to 125 nm, a retardation value of the film represented by Re590 measured at the wavelength of 590 nm is in the range of 120 to 160 nm, and a retardation values represented by Re450 and Re590 satisfy the condition of Re590−Re450≧2 nm, and wherein the film contains an aromatic compound having at least two aromatic rings as a retardation increasing agent.

The invention also provides a circularly polarizing plate comprising a phase retarder and a linearly polarizing membrane, said phase retarder and said linearly polarizing membrane being so laminated that a slow axis in plane of the phase retarder is at an angle of 45° to a polarizing axis of the linearly polarizing membrane, and said phase retarder comprising one cellulose ester film, wherein a retardation value of the film represented by Re450 measured at the wavelength of 450 nm is in the range of 100 to 125 nm, a retardation value of the film represented by Re590 measured at the wavelength of 590 nm is in the range of 120 to 160 nm, and a retardation values represented by Re450 and Re590 satisfy the condition of Re590−Re450≧2 nm, and wherein the film contains an aromatic compound having at least two aromatic rings as a retardation increasing agent.

The invention further provides a liquid crystal display of reflection type comprising a reflector, a liquid crystal cell and a polarizing plate in this order; wherein a $\lambda/4$ plate is further provided between the reflector and the polarizing membrane, said $\lambda/4$ plate comprising one cellulose ester film, wherein a retardation value of the film represented by Re450 measured at the wavelength of 450 nm is in the range of 100, to 125 nm, a retardation value of the film represented by Re590 measured at the wavelength of 590 nm is in the range of 120 to 160 nm, and a retardation values represented by Re450 and Re590 satisfy the condition of Re590−Re450≧2 nm, and wherein the film contains an aromatic compound having at least two aromatic rings as a retardation increasing agent.

The invention furthermore provides a phase retarder comprising one cellulose ester film, wherein a retardation value of the film represented by Re450 measured at the wavelength of 450 nm is in the range of 200 to 250 nm, a retardation value of the film represented by Re590 measured at the wavelength of 590 nm is in the range of 240 to 320 nm, and a retardation values represented by Re450 and Re590 satisfy the condition of Re590−Re450≧4 nm, and wherein the film contains an aromatic compound having at least two aromatic rings as a retardation increasing agent.

The present inventors have studied and revealed that a cellulose ester film containing a retardation increasing agent of an aromatic compound having at least two aromatic rings gives $\lambda/4$ or $\lambda/2$ in a wide wavelength region. Accordingly, a phase retarder comprising one polymer film giving $\lambda/4$ or $\lambda/2$ in a wide wavelength region can be obtained. This means that it is not necessary to laminate two polymer films so that the angle between them should be strictly adjusted. Further, the cellulose ester film used for the phase retarder of the invention is superior to a conventional polymer film (for example, a stretched film of synthetic polymer such as polycarbonate) in view of adhesion to and in view of protection of a linearly polarizing membrane in a circularly polarizing plate.

Figure 1:
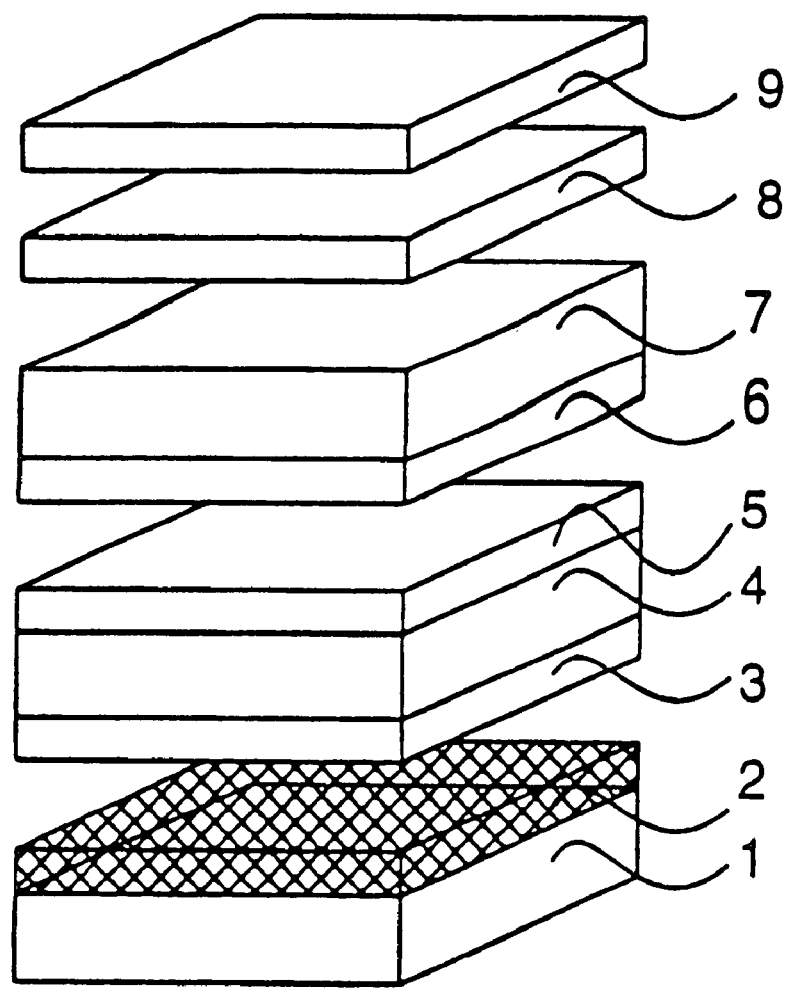
FIG. 1 schematically illustrates a basic structure of a liquid crystal display of reflection type.

DETAILED DESCRIPTION OF THE INVENTION (Phase Retarder)

In the case where the phase retarder is used as a $\lambda/4$ plate, the retardation values Re450 and Re590 measured at 450 nm and 590 nm, respectively, satisfy the conditions of: 100 nm≦ Re450≦125 nm, 120 nm≦Re590≦160 nm, and Re590−Re450≧2 nm. The value of Re590−Re450 is preferably not less than 5 nm, and more preferably not less than 10nm. Further, the retardation values Re450, Re550 and Re590 measured at 450 nm, 550 nm and 590 nm, respectively, preferably satisfy the conditions of: 108 nm≦Re450 5 120 nm, 125 nm≦Re550≦142 nm, 130 nm≦Re590≦152 nm, and Re590−Re550≧2 nm. The value of Re590−Re550 is more preferably not less than 5 nm, and most preferably not less than 7 nm. The value of Re550−Re450 is preferably not less than 10 nm.

In the case where the phase retarder is used as a $\lambda/2$ plate, the retardation values Re450 and Re590 measured at 450 nm and 590 nm, respectively, satisfy the conditions of: 200 nm≦Re450≦250 nm, 240 nm≦Re590≦320 nm, and Re590−Re450≧4 nm. The value of Re590−Re450 is preferably not less than 10 nm, and more preferably not less than 20 nm. Further, the retardation values Re450, Re550 and Re590 measured at 450 nm, 550 nm and 590 nm, respectively, preferably satisfy the conditions of: 216 nm $\leq$ Re450 $\leq$ 240 nm, 250 nm $\leq$ Re550 $\leq$ 284 nm, 260 nm $\leq$ Re590 $\leq$ 304 nm, and Re590−Re550 $\geq$ 4 nm. The value of Re590−Re550 is more preferably not less than 10 nm, and most preferably not less than 14 nm. The value of Re550−Re450 is preferably not less than 20 nm.

The retardation value Re is calculated from the following formula:

$$Re = (nx - ny) \times d$$

in which nx is the refractive index along the slow axis in plane (the maximum refractive index in plane) of the phase retarder, ny is the refractive index perpendicular to the slow axis in plane of the phase retarder, and d is the thickness (nm) of the phase retarder.

The refractive indexes further preferably satisfy the following formula:

$$1 \leq (nx - nz)/(nx - ny) \leq 2$$

in which nx is the refractive index along the slow axis in plane of the phase retarder, ny is the refractive index perpendicular to the slow axis in plane of the phase retarder, and nz is the refractive index along the thickness direction. The refractive indexes are measured at 550 nm.

The phase retarder comprising single cellulose ester film has a thickness of preferably 5 to 100 μm, more preferably 10 to 500 μm, further preferably 40 to 200 μm, and most preferably 70 to 120 μm.

The above-described phase retarder can be produced from the following materials according to the method described below.

(Cellulose Ester)

A lower fatty acid ester of cellulose is preferably used. Here, 'a lower fatty acid' means a fatty acid having not more than 6 carbon atoms. The number of carbon atoms is preferably 2, 3 or 4 (namely, cellulose acetate, cellulose propionate or cellulose butyrate is preferred). Cellulose acetate is particularly preferred. A mixed fatty acid ester such as cellulose acetate propionate or cellulose acetate butyrate can be also used.

The average acetic acid content of cellulose acetate is preferably in the range of 45.0 to 62.5%, more preferably in the range of 55.0 to 61.0%.

(Retardation Increasing Agent)

In the present invention, an aromatic compound having at least two aromatic rings is used as a retardation increasing agent.

The retardation increasing agent is used preferably in an amount of 0.05 to 20 weight parts, more preferably in an amount of 0.1 to 10 weight parts, further preferably in an amount of 0.2 to 5 weight parts, and most preferably in an amount of 0.5 to 2 weight parts, based on 100 weight parts of the cellulose ester.

The retardation increasing agent preferably shows the maximum absorption in the wavelength region of 250 to 400 nm. It is also preferred for the agent to have essentially no absorption in the visible wavelength region.

The aromatic compound used as the retardation increasing agent is further described below in detail.

In the present invention, 'an aromatic ring' means not only an aromatic hydrocarbon ring but also an aromatic heterocyclic ring.

As the aromatic hydrocarbon ring, a six-membered ring (namely, a benzene ring) is preferred.

The aromatic heterocyclic ring is generally unsaturated. The aromatic heterocyclic ring is preferably a five-, six- or seven-membered ring, and more preferably a five- or six-membered ring. The aromatic heterocyclic ring generally has double bonds as many as possible. The hetero-atom in the ring preferably is nitrogen atom, sulfur atom or oxygen atom, and more preferably is nitrogen atom. Examples of the aromatic heterocyclic ring include furan ring, thiophene ring, pyrrole ring, oxazole ring, isoxazole ring, thiazole ring, isothiazole ring, imidazole ring, pyrazole ring, furazane ring, triazole ring, pyran ring, pyridine ring, pyridazine ring, pyrimidine ring, pyrazine ring and 1,3,5-triazine ring.

Preferred aromatic rings are benzene ring, furan ring, thiophene ring, pyrrole ring, oxazole ring, thiazole ring, triazole ring, pyridine ring, pyrimidine ring, pyrazine ring and 1,3,5-triazine ring. Benzene ring and 1,3,5-triazine ring are more preferred. The aromatic heterocyclic ring further preferably has 1,3,5-triazine ring, and most preferably has both 1,3,5-triazine ring and benzene ring.

The number of aromatic rings in the retardation increasing agent is preferably in the range of 2 to 20, more preferably in the range of 2 to 12, further preferably in the range of 2 to 8, furthermore preferably in the range of 2 to 6, and most preferably in the range of 3 to 6.

The relation of the two or more aromatic rings is categorized into three cases, namely (a) the case in which the aromatic rings forms a condensed ring, (b) the case in which the aromatic rings are connected through a single bond, and (c) the case in which the aromatic rings are connected through a linking group. [In this case, a spiro-bonding is not formed because the rings are aromatic.]

The relation of the aromatic rings may be any of the cases (a) to (c).

Examples of the condensed ring in the case (a) include indene ring, naphthalene ring, azulene ring, fluorene ring, phenanthrene ring, anthracene ring, acenaphthylene ring, biphenylene ring, naphthacene ring, pyrene ring, indole ring, isoindole ring, benzofuran ring, benzothiophene ring, indolizine ring, benzoxazole ring, benzothiazole ring, benzimidazole ring, benztriazole ring, purine ring, indazole ring, chromene ring, quinoline ring, isoquinoline ring, quinolizine ring, quinazoline ring, cinnoline ring, quinoxaline ring, phthalazine ring, pteridine ring, carbazole ring, acridine ring, phenanthridine ring, xanthene ring, phenazine ring, phenothiazine ring, phenoxthine ring, phenoxazine ring and thianthrene ring. Preferred are naphthalene ring, azulene ring, indole ring, benzoxazole ring, benzothiazole ring, benzimidazole ring, benztriazole ring and quinoline ring.

The single bond in the case (b) is preferably between carbon atoms of the two aromatic rings. Two or more single bonds may connect the two aromatic rings to form an aliphatic ring or a non-aromatic ring between them.

The linking group in the case (c) is also preferably between carbon atoms of the two aromatic rings. The linking group is preferably an alkylene group, an alkenylene group, an alkynylene group, —CO—, —O—, —NH—, —S— or a combination thereof.

Examples of the combined linking group are shown below. In each of the following examples, the right and left terminals may be reversed.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH— d10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic ring and the linking group may have substituent groups.

Examples of the substituent group include halogen atoms (F, Cl, Br, I), hydroxyl, carboxyl, cyano, amino, nitro, sulfo, carbamoyl, sulfamoyl, ureido, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, an alkylsulfonyl group, an aliphatic amide group, an aliphatic sulfoneamide group, an aliphatic substituted amine group, an aliphatic substituted carbamoyl group, an aliphatic substituted sulfamoyl group, an aliphatic substituted ureido group and a nor-aromatic heterocyclic group.

The alkyl group preferably has 1 to 8 carbon atoms. A chain alkyl group is preferred to a cyclic one, and a straight chain alkyl group is particularly preferred. The. alkyl group may further have a susbstituent group (e.g., hydroxyl, carboxyl, an alkoxy group, an alkyl-substituted amino group). Examples of the (substituted) alkyl group include methyl, ethyl, n-butyl, n-hexyl, 2-hydroxyethyl, 4-carboxybutyl, 2-methoxyethyl and 2-diethylaminoethyl.

The alkenyl group preferably has 2 to 8 carbon atoms. A chain alkenyl group is preferred to a cyclic one, and a straight chain alkenyl group is particularly preferred. The alkenyl group may further have a susbstituent group. Examples of the alkenyl group include vinyl, allyl and 1-hexenyl.

The alkynyl group preferably has 2 to 8 carbon atoms. A chain alkynyl group is preferred to a cyclic one, and a straight chain alkynyl group is particularly preferred. The alkynyl group may further have a susbstituent group. Examples of the alkynyl group include ethynyl, 1-butynyl and 1-hexynyl.

The aliphatic acyl group preferably has 1 to 10 carbon atoms. Examples of the aliphatic acyl group include acetyl, propanoyl and butanoyl.

The aliphatic acyloxy group preferably has 1 to 10 carbon atoms. Examples of the aliphatic acyloxy group include acetoxy.

The alkoxy group preferably has 1 to 8 carbon atoms. The alkoxy group may further have a susbstituent group (e.g., another alkoxy group). Examples of the (substituted) alkoxy group include methoxy, ethoxy,butoxy and methoxyethoxy.

The alkoxycarbonyl group preferably has 2 to 10 carbon atoms. Examples of the alkoxycarbonyl group include methoxycarbonyl and ethoxycarbonyl.

The alkoxycarbonylamino group preferably has 2 to 10 carbon atoms. Examples of the alkoxycarbonylamino group include methoxycarbonylamino and ethoxycarbonylamino.

The alkylthio group preferably has 1 to 12 carbon atoms. Examples of the alkylthio group include methylthio, ethylthio and octylthio.

The alkylsulfonyl group preferably has 1 to 8 carbon atoms. Examples of the alkylsulfonyl group include methanesulfonyl and ethanesulfonyl.

The aliphatic amide group preferably has 1 to 10 carbon atoms. Examples of the aliphatic amide group include acetoamide The aliphatic sulfoneamide group preferably has 1 to 8 carbon atoms. Examples of the aliphatic sulfoneamide group include methanesulfoneamide, butanesulfoneamide and n-octanesulfoneamide.

The aliphatic substituted amine group preferably has 1 to 10 carbon atoms. Examples of the aliphatic substituted amine group include dimethylamino, diethylamino and 2-carboxyethyl amino.

The aliphatic substituted carbamoyl group preferably has 2 to 10 carbon atoms. Examples of the aliphatic substituted carbamoyl group include methylcarbamoyl and diethylcarbamoyl.

The aliphatic substituted sulfamoyl group preferably has 1 to 8 carbon atoms. Examples of the aliphatic substituted sulfamoyl group include methylsulfamoyl and diethylsulfamoyl.

The aliphatic substituted ureido group preferably has 2 to 10 carbon atoms. Examples of the aliphatic substituted ureido group include methylureido.

Examples of the non-aromatic heterocyclic group include piperidino and morpholino.

The retardation increasing agent has a molecular weight of 300 to 800.

A particularly preferred compound having 1,3,5-triazine ring is preferably represented by the formula (I):

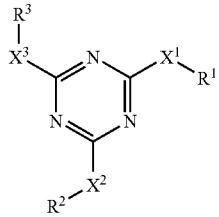

in which $X^1$ is a single bond, —$NR^4$—, —O— or —S—; $X^2$ is a single bond, —$NR^5$—, —O— or —S—; $X^3$ is a single bond, —$NR^6$—, —O— or —S—; each of $R^1$, $R^2$ and $R^3$ is independently an alkyl group, an alkenyl group, an aryl group or a heterocyclic group; each of $R^4$, $R^5$ and $R^6$ is independently hydrogen, an alkyl group, an alkenyl group, an aryl group or a heterocyclic group; and at least one of $R^1$, $R^2$, $R^3$, $R^4$, $R^5$ and $R^6$ includes an aromatic ring.

The compound represented by the formula (I) is preferably a melamine compound, in which $X^1$, $X^2$ and $X^3$ are —$NR^4$—, —$NR^5$— and —$NR^6$—, respectively, or are single bonds provided that each of $R^1$, $R^2$ and $R^3$ is a heterocyclic group having a nitrogen atom with a free radical.

The groups —$X^1$—$R^1$, —$X^2$—$R^2$ and —$X^3$—$R^3$ are preferably identical.

Each of $R^1$, $R^2$ and $R^3$ is preferably an aryl group.

Each of $R^4$, $R^5$ and $R^6$ is preferably hydrogen.

The alkyl group preferably has a chain structure rather than a cyclic structure, and more preferably has a straight chain structure rather than a branched chain structure. The alkyl group preferably has 1 to 30 carbon atoms, more preferably has 1 to 20 carbon atoms, further preferably has 1 to 10 carbon atoms, furthermore preferably has 1 to 8 carbon atoms, and most preferably has 1 to 6 carbon atoms. Further, the alkyl group can have a substituent group. Examples of the substituent groups include a halogen atom, an alkoxy group (e.g., methoxy, ethoxy, epoxyethyloxy) and an acyloxy group (e.g., acryloyloxy, methacryloyloxy).

The alkenyl group preferably has a chain structure rather than a cyclic structure, and more preferably has a straight chain structure rather than a branched chain structure. The alkenyl group preferably has 2 to 30, more preferably has 2 to 20 carbon atoms, further preferably has 2 to 10 carbon atoms, furthermore preferably has 2 to 8 carbon atoms, and most preferably has 2 to 6 carbon atoms. Further, the alkenyl group can have a substituent group. Examples of the substituent groups include a halogen atom, an alkoxy group (e.g., methoxy, ethoxy, epoxyethyloxy) and an acyloxy group (e.g., acryloyloxy, methacryloyloxy).

The aryl group preferably is phenyl or naphthyl, and more preferably is phenyl. The aryl group can have a substituent group. Examples of the substituent groups include a halogen atom, hydroxyl, cyano, nitro, carboxyl, an alkyl. group, an alkenyl group, an aryl group, an alkoxy group, an alkenyloxy group, an aryloxy group, an acyloxy group, an alkoxycarbonyl group, an alkenyloxycarbonyl group, an aryloxycarbonyl group, sulfamoyl, an alkyl-substituted sulfamoyl group, an alkenyl-substituted sulfamoyl group, an aryl-substituted sulfamoyl group, a sulfonamide group, carbamoyl, an alkyl-substituted carbamoyl group, an alkenyl-substituted carbamoyl group, an aryl-substituted carbamoyl group, an amide group, an alkylthio group, an alkenylthio group, an arylthio group and an acyl group.

The alkyl group is described above. The alkyl moiety of the alkoxy group, the acyloxy group; the alkoxycarbonyl group, the alkyl-substituted sulfamoyl group, the sulfonamide group, the alkyl-substituted carbamoyl group, the amide group, the alkylthio group and the acyl group is the same as the alkyl group described above.

The alkenyl group is described above. The alkenyl moiety of the alkenyloxy group, the acyloxy group, the alkenyloxycarbonyl group, the alkenyl-substituted sulfamoyl group, the sulfonamide group, the alkenyl-substituted carbamoyl group, the amide group, the alkenylthio group and the acyl group is the same as the alkenyl group described above.

Examples of the aryl group include phenyl, α-naphthyl, β-naphthyl, 4-methoxyphenyl, 3,4-diethoxyphenyl, 4-octyloxyphenyl and 4-dodecyoxyphenyl. The aryl moiety of the aryloxy group, the acyloxy group, the aryloxycarbonyl group, the aryl-substituted sulfamoyl group, the sulfonamide group, the aryl-substituted carbamoyl group, the amide group, the arylthio group and the acyl group is the same as the aryl group.

In the case that $X^1$, $X^2$ or $X^3$ is —NR—, —O— or —S—, the heterocyclic ring is preferably aromatic. The aromatic heterocyclic ring is generally unsaturated, and preferably has double bonds as many as possible. The heterocyclic ring preferably is five-membered, six-membered or seven-membered ring, more preferably is five-membered or six-membered ring, and most preferably is six-membered ring. The hetero-atom in the ring preferably is N, S or O, and more preferably is N. A particularly preferred aromatic heterocyclic ring is a pyridine ring (2-pyridyl or 4-pyridyl). The heterocyclic ring can have a substituent group. Examples of the substituent groups are the same as the substituent groups of the aryl group described above.

In the case that $X^1$, $X^2$ or $X^3$ is a single bond, the heterocyclic ring preferably has a nitrogen atom with a free radical. The heterocyclic ring preferably is five-membered, six-membered or seven-membered ring, more preferably is five-membered or six-membered ring, and most preferably is five-membered ring. The heterocyclic ring can have two or more nitrogen atoms. The heterocyclic ring may have a hetero-atom (e.g., O, S) other than nitrogen, and can have a substituent group. Examples of the substituent groups are the same as the substituent groups of the aryl group described above. Examples of the heterocyclic rings having a nitrogen atom with a free radical are shown below.

(Hc-1)
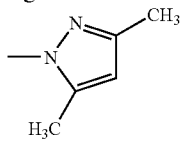

(Hc-2)
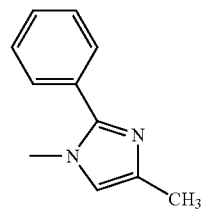

(Hc-3)
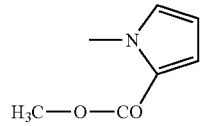

(Hc-4)
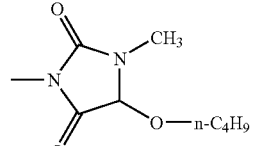

(Hc-5)
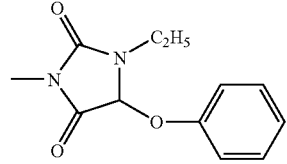

(Hc-6)
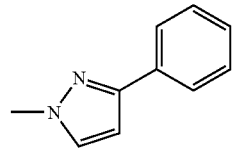

(Hc-7)
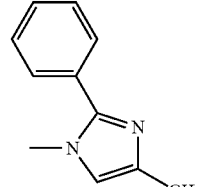

(Hc-8)
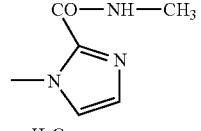

(Hc-9)
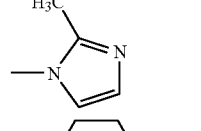

(Hc-10)
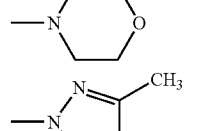

(Hc-11)
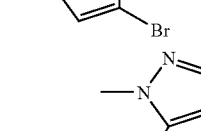

(Hc-12)
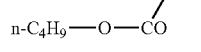

Examples of the compound having 1,3,5-triazine ring are shown below. Two or more groups represented by R in the formulas are identical, and the definition of R is given under each of the formulas by referring to the example number.

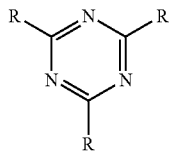
(1)–(9)

(1) phenyl
(2) 4-ethoxycarbonylphenyl
(3) 4-butoxyphenyl
(4) p-biphenyl
(5) 4-pyridyl
(6) 2-naphthyl
(7) 2-methylphenyl
(8) 3,4-dimethoxyphenyl
(9) 2-furyl

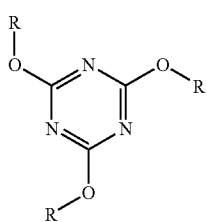
(14)–(79)

(14) phenyl
(15) 3-ethoxycarbonylphenyl
(16) 3-butoxyphenyl
(17) m-biphenylyl
(18) 3-phenylthiophenyl
(19) 3-chlorophenyl
(20) 3-benzoylphenyl
(21) 3-acetoxyphenyl
(22) 3-benzoyloxyphenyl
(23) 3-phenoxycarbonylphenyl
(24) 3-methoxyphenyl
(25) 3-anilinophenyl
(26) 3-isobutylylaminophenyl
(27) 3-phenoxycarbonylaminophenyl
(28) 3-(3-ethylureido)phenyl
(29) 3-(3,3-diethylureido)phenyl
(30) 3-methylphenyl
(31) 3-phenoxyphenyl
(32) 3-hydroxyphenyl
(33) 4-ethoxycarbonylphenyl
(34) 4-butoxyphenyl
(35) p-biphenylyl
(36) 4-phenylthiophenyl
(37) 4-chlorophenyl
(38) 4-benzoylphenyl
(39) 4-acetoxyphenyl
(40) 4-benzoyloxyphenyl
(41) 4-phenoxycarbonylphenyl
(42) 4-methoxyphenyl
(43) 4-anilinophenyl
(44) 4-isobutylylaminophenyl
(45) 4-phenoxycarbonylaminophenyl
(46) 4-(3-ethylureido)phenyl
(47) 4-(3,3-diethylureido)phenyl
(48) 4-methylphenyl
(49) 4-phenoxyphenyl
(50) 4-hydroxyphenyl
(51) 3,4-diethoxycarbonylphenyl
(52) 3,4-dibutoxyphenyl
(53) 3,4-diphenylphenyl
(54) 3,4-diphenylthiophenyl
(55) 3,4-dichlorophenyl
(56) 3,4-dibenzoylphenyl
(57) 3,4-diacetoxyphenyl
(58) 3,4-dibenzoyloxyphenyl
(59) 3,4-diphenoxycarbonylphenyl
(60) 3,4-dimethoxyphenyl
(61) 3,4-dianilinophenyl
(62) 3,4-dimethylphenyl
(63) 3,4-diphenoxyphenyl
(64) 3,4-dihydroxyphenyl
(65) 2-naphthyl
(66) 3,4,5-triethoxycarbonylphenyl
(67) 3,4,5-tributoxyphenyl
(68) 3,4,5-triphenylphenyl
(69) 3,4,5-triphenylthiophenyl
(70) 3,4,5-trichlorophenyl
(71) 3,4,5-tribenzoylphenyl
(72) 3,4,5-triacetoxyphenyl
(73) 3,4,5-tribenzoyloxyphenyl
(74) 3,4,5-triphenoxycarbonylphenyl
(75) 3,4,5-trimethoxyphenyl
(76) 3,4,5-trianilinophenyl
(77) 3,4,5-trimethylphenyl
(78) 3,4,5-triphenoxyphenyl
(79) 3,4,5-trihydroxyphenyl

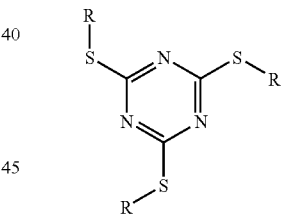
(80)–(145)

(80) phenyl
(81) 3-ethoxycarbonylphenyl
(82) 3-butoxyphenyl
(83) m-biphenylyl
(84) 3-phenylthiophenyl
(85) 3-chlorophenyl
(86) 3-benzoylphenyl
(87) 3-acetoxyphenyl
(88) 3-benzoyloxyphenyl
(89) 3-phenoxycarbonylphenyl
(90) 3-methoxyphenyl
(91) 3-anilinophenyl
(92) 3-isobutylylaminophenyl
(93) 3-phenoxycarbonylaminophenyl
(94) 3-(3-ethylureido)phenyl
(95) 3-(3,3-diethylureido)phenyl
(96) 3-methylphenyl
(97) 3-phenoxyphenyl

(98) 3-hydroxyphenyl
(99) 4-ethoxycarbonylphenyl
(100) 4-butoxyphenyl
(101) p-biphenylyl
(102) 4-phenylthiophenyl
(103) 4-chlorophenyl
(104) 4-benzoylphenyl
(105) 4-acetoxyphenyl
(106) 4-benzoyloxyphenyl
(107) 4-phenoxycarbonylphenyl
(108) 4-methoxyphenyl
(109) 4-anilinophenyl
(110) 4-isobutylylaminophenyl
(111) 4-phenoxycarbonylaminophenyl
(112) 4-(3-ethylureido)phenyl
(113) 4-(3,3-diethylureido)phenyl
(114) 4-methylphenyl
(115) 4-phenoxyphenyl
(116) 4-hydroxyphenyl
(117) 3,4-diethoxycarbonylphenyl
(118) 3,4-dibutoxyphenyl
(119) 3,4-diphenylphenyl
(120) 3,4-diphenylthiophenyl
(121) 3,4-dichlorophenyl
(122) 3,4-dibenzoylphenyl
(123) 3,4-diacetoxyphenyl
(124) 3,4-dibenzoyloxyphenyl
(125) 3,4-diphenoxycarbonylphenyl
(126) 3,4-dimethoxyphenyl
(127) 3,4-dianilinophenyl
(128) 3,4-dimethylphenyl
(129) 3,4-diphenoxyphenyl
(130) 3,4-dihydroxyphenyl
(131) 2-naphthyl
(132) 3,4,5-triethoxycarbonylphenyl
(133) 3,4,5-tributoxyphenyl
(134) 3,4,5-triphenylphenyl
(135) 3,4,5-triphenylthiophenyl
(136) 3,4,5-trichlorophenyl
(137) 3,4,5-tribenzoylphenyl
(138) 3,4,5-triacetoxyphenyl
(139) 3,4,5-tribenzoyloxyphenyl
(140) 3,4,5-triphenoxycarbonylphenyl
(141) 3,4,5-trimethoxyphenyl
(142) 3,4,5-trianilinophenyl
(143) 3,4,5-trimethylphenyl
(144) 3,4,5-triphenoxyphenyl
(145) 3,4,5-trihydroxyphenyl (146)–(164)

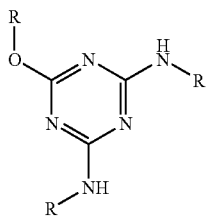

(146) phenyl
(147) 4-ethoxycarbonylphenyl
(148) 4-butoxyphenyl
(149) p-biphenylyl
(150) 4-phenylthiophenyl
(151) 4-chlorophenyl
(152) 4-benzoylphenyl
(153) 4-acetoxyphenyl
(154) 4-benzoyloxyphenyl
(155) 4-phenoxycarbonylphenyl
(156) 4-methoxyphenyl
(157) 4-anilinophenyl
(158) 4-isobutylylaminophenyl
(159) 4-phenoxycarbonylaminophenyl
(160) 4-(3-ethylureido)phenyl
(161) 4-(3,3-diethylureido)phenyl
(162) 4-methylphenyl
(163) 4-phenoxyphenyl
(164) 4-hydroxyphenyl (165)–(183)

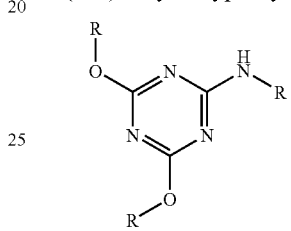

(165) phenyl
(166) 4-ethoxycarbonylphenyl
(167) 4-butoxyphenyl
(168) p-biphenylyl
(169) 4-phenylthiophenyl
(170) 4-chlorophenyl
(171) 4-benzoylphenyl
(172) 4-acetoxyphenyl
(173) 4-benzoyloxyphenyl
(174) 4-phenoxycarbonylphenyl
(175) 4-methoxyphenyl
(176) 4-anilinophenyl
(177) 4-isobutylylaminophenyl
(178) 4-phenoxycarbonylaminophenyl
(179) 4-(3-ethylureido)phenyl
(180) 4-(3,3-diethylureido)phenyl
(181) 4-methylphenyl
(182) 4-phenoxyphenyl
(183) 4-hydroxyphenyl (184)–(202)

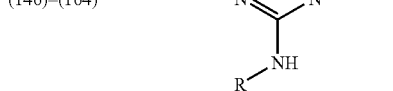

(184) phenyl
(185) 4-ethoxycarbonylphenyl
(186) 4-butoxyphenyl
(187) p-biphenylyl
(188) 4-phenylthiophenyl
(189) 4-chlorophenyl
(190) 4-benzoylphenyl (191) 4-acetoxyphenyl
(192) 4-benzoyloxyphenyl
(193) 4-phenoxycarbonylphenyl
(194) 4-methoxyphenyl
(195) 4-anilinophenyl
(196) 4-isobutylylaminophenyl
(197) 4-phenoxycarbonylaminophenyl
(198) 4-(3-ethylureido)phenyl
(199) 4-(3,3-diethylureido)phenyl
(200) 4-methylphenyl
(201) 4-phenoxyphenyl
(202) 4-hydroxyphenyl

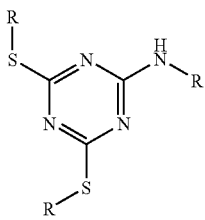

(203)–(221)

(203) phenyl
(204) 4-ethoxycarbonylphenyl
(205) 4-butoxyphenyl
(206) p-biphenylyl
(207) 4-phenylthiophenyl
(208) 4-chlorophenyl
(209) 4-benzoylphenyl
(210) 4-acetoxyphenyl
(211) 4-benzoyloxyphenyl
(212) 4-phenoxycarbonylphenyl
(213) 4-methoxyphenyl
(214) 4-anilinophenyl
(215) 4-isobutylylaminophenyl
(216) 4-phenoxycarbonylaminophenyl
(217) 4-(3-ethylureido)phenyl
(218) 4-(3,3-diethylureido)phenyl
(219) 4-methylphenyl
(220) 4-phenoxyphenyl
(221) 4-hydroxyphenyl

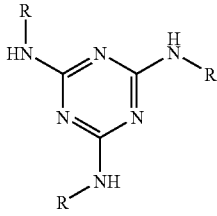

(222)–(413)

(222) phenyl
(223) 4-butylphenyl
(224) 4-(2-methoxy-2-ethoxyethyl)phenyl
(225) 4-(5-nonenyl)phenyl
(226) p-biphenylyl
(227) 4-ethoxycarbonylphenyl
(228) 4-butoxyphenyl
(229) 4-methylphenyl
(230) 4-chlorophenyl
(231) 4-phenylthiophenyl
(232) 4-benzoylphenyl (233) 4-acetoxyphenyl
(234) 4-benzoyloxyphenyl
(235) 4-phenoxycarbonylphenyl
(236) 4-methoxyphenyl
(237) 4-anilinophenyl
(238) 4-isobutylylaminophenyl
(239) 4-phenoxycarbonylaminophenyl
(240) 4-(3-ethylureido)phenyl
(241) 4-(3,3-diethylureido)phenyl
(242) 4-phenoxyphenyl
(243) 4-hydroxyphenyl
(244) 3-butylphenyl
(245) 3-(2-methoxy-2-ethoxyethyl)phenyl
(246) 3-(5-nonenyl)phenyl
(247) m-biphenylyl
(248) 3-ethoxycarbonylphenyl
(249) 3-butoxyphenyl
(250) 3-methylphenyl
(251) 3-chlorophenyl
(252) 3-phenylthiophenyl
(253) 3-benzoylphenyl
(254) 3-acetoxyphenyl
(255) 3-benzoyloxyphenyl
(256) 3-phenoxycarbonylphenyl
(257) 3-methoxyphenyl
(258) 3-anilinophenyl
(259) 3-isobutylylaminophenyl
(260) 3-phenoxycarbonylaminophenyl
(261) 3-(3-ethylureido)phenyl
(262) 3-(3,3-diethylureido)phenyl
(263) 3-phenoxyphenyl
(264) 3-hydroxyphenyl
(265) 2-butylphenyl
(266) 2-(2-methoxy-2-ethoxyethyl)phenyl
(267) 2-(5-nonenyl)phenyl
(268) o-biphenylyl
(269) 2-ethoxycarbonylphenyl
(270) 2-butoxyphenyl
(271) 2-methylphenyl
(272) 2-chlorophenyl
(273) 2-phenylthiophenyl
(274) 2-benzoylphenyl
(275) 2-acetoxyphenyl
(276) 2-benzoyloxyphenyl
(277) 2-phenoxycarbonylphenyl
(278) 2-methoxyphenyl
(279) 2-anilinophenyl
(280) 2-isobutylylaminophenyl
(281) 2-phenoxycarbonylaminophenyl
(282) 2-(3-ethylureido)phenyl
(283) 2-(3,3-diethylureido)phenyl
(284) 2-phenoxyphenyl
(285) 2-hydroxyphenyl
(286) 3,4-dibutylphenyl
(287) 3,4-di(2-methoxy-2-ethoxyethyl)phenyl
(288) 3,4-diphenylphenyl
(289) 3,4-diethoxycarbonylphenyl
(290) 3,4-didodecyloxyphenyl
(291) 3,4-dimethylphenyl (292) 3,4-dichlorophenyl
(293) 3,4-dibenzoylphenyl
(294) 3,4-diacetoxyphenyl
(295) 3,4-dimethoxyphenyl
(296) 3,4-di-N-methylaminophenyl
(297) 3,4-diisobutylylaminophenyl
(298) 3,4-diphenoxyphenyl
(299) 3,4-dihydroxyphenyl
(300) 3,5-dibutylphenyl
(301) 3,5-di(2-methoxy-2-ethoxyethyl)phenyl
(302) 3,5-diphenylphenyl
(303) 3,5-diethoxycarbonylphenyl
(304) 3,5-didodecyloxyphenyl
(305) 3,5-dimethylphenyl
(306) 3,5-dichlorophenyl
(307) 3,5-dibenzoylphenyl
(308) 3,5-diacetoxyphenyl
(309) 3,5-dimethoxyphenyl
(310) 3,5-di-N-methylaminophenyl
(311) 3,5-diisobutylylaminophenyl
(312) 3,5-diphenoxyphenyl
(313) 3,5-dihydroxyphenyl
(314) 2,4-dibutylphenyl
(315) 2,4-di(2-methoxy-2-ethoxyethyl)phenyl
(316) 2,4-diphenylphenyl
(317) 2,4-diethoxycarbonylphenyl
(318) 2,4-didodecyloxyphenyl
(319) 2,4-dimethylphenyl
(320) 2,4-dichlorophenyl
(321) 2,4-dibenzoylphenyl
(322) 2,4-diacetoxyphenyl
(323) 2,4-dimethoxyphenyl
(324) 2,4-di-N-methylaminophenyl
(325) 2,4-diisobutylylaminophenyl
(326) 2,4-diphenoxyphenyl
(327) 2,4-dihydroxyphenyl
(328) 2,3-dibutylphenyl
(329) 2,3-di(2-methoxy-2-ethoxyethyl)phenyl
(330) 2,3-diphenylphenyl
(331) 2,3-diethoxycarbonylphenyl
(332) 2,3-didodecyloxyphenyl
(333) 2,3-dimethylphenyl
(334) 2,3-dichlorophenyl
(335) 2,3-dibenzoylphenyl
(336) 2,3-diacetoxyphenyl
(337) 2,3-dimethoxyphenyl
(338) 2,3-di-N-methylaminophenyl
(339) 2,3-diisobutylylaminophenyl
(340) 2,3-diphenoxyphenyl
(341) 2,3-dihydroxyphenyl
(342) 2,6-dibutylphenyl
(343) 2,6-di(2-methoxy-2-ethoxyethyl)phenyl
(344) 2,6-diphenylphenyl
(345) 2,6-diethoxycarbonylphenyl
(346) 2,6-didodecyloxyphenyl
(347) 2,6-dimethylphenyl
(348) 2,6-dichlorophenyl
(349) 2,6-dibenzoylphenyl
(350) 2,6-diacetoxyphenyl
(351) 2,6-dimethoxyphenyl
(352) 2,6-di-N-methylaminophenyl
(353) 2,6-diisobutylylaminophenyl
(354) 2,6-diphenoxyphenyl
(355) 2,6-dihydroxyphenyl
(356) 3,4,5-tributylphenyl
(357) 3,4,5-tri(2-methoxy-2-ethoxyethyl)phenyl
(358) 3,4,5-triphenylphenyl
(359) 3,4,5-triethoxycarbonylphenyl
(360) 3,4,5-tridodecyloxyphenyl
(361) 3,4,5-trimethylphenyl
(362) 3,4,5-trichlorophenyl
(363) 3,4,5-tribenzoylphenyl
(364) 3,4,5-triacetoxyphenyl
(365) 3,4,5-trimethoxyphenyl
(366) 3,4,5-tri-N-methylaminophenyl
(367) 3,4,5-triisobutylylaminophenyl
(368) 3,4,5-triphenoxyphenyl
(369) 3,4,5-trihydroxyphenyl
(370) 2,4,6-tributylphenyl
(371) 2,4,6-tri(2-methoxy-2-ethoxyethyl)phenyl
(372) 2,4,6-triphenylphenyl
(373) 2,4,6-triethoxycarbonylphenyl
(374) 2,4,6-tridodecyloxyphenyl
(375) 2,4,6-trimethylphenyl
(376) 2,4,6-trichlorophenyl
(377) 2,4,6-tribenzoylphenyl
(378) 2,4,6-triacetoxyphenyl
(379) 2,4,6-trimethoxyphenyl
(380) 2,4,6-tri-N-methylaminophenyl
(381) 2,4,6-triisobutylylaminophenyl
(382) 2,4,6-triphenoxyphenyl
(383) 2,4,6-trihydroxyphenyl
(384) pentafluorophenyl
(385) pentachlorophenyl
(386) pentamethoxyphenyl
(387) 6-N-methylsulfamoyl-8-methoxy-2-naphthyl
(388) 5-N-methylsulfamoyl-2-naphthyl
(389) 6-N-phenylsulfamoyl-2-naphthyl
(390) 5-ethoxy-7-N-methylsulfamoyl-2-naphthyl
(391) 3-methoxy-2-naphthyl
(392) 1-ethoxy-2-naphthyl
(393) 6-N-phenylsulfamoyl-8-methoxy-2-naphthyl
(394) 5-methoxy-7-N-phenylsulfamoyl-2-naphthyl
(395) 1-(4-methylphenyl)-2-naphthyl
(396) 6,8-di-N-methylsulfamoyl-2-naphthyl
(397) 6-N-2-acetoxyethylsulfamoyl-8-methoxy-2-naphthyl
(398) 5-acetoxy-7-N-phenylsulfamoyl-2-naphthyl
(399) 3-benzoyloxy-2-naphthyl
(400) 5-acetylamino-1-naphthyl
(401) 2-methoxy-1-naphthyl
(402) 4-phenoxy-1-naphthyl
(403) 5-N-methylsulfamoyl-1-naphthyl
(404) 3-N-methylcarbamoyl-4-hydroxy-1-naphthyl
(405) 5-methoxy-6-N-ethylsulfamoyl-1-naphthyl
(406) 7-tetradecyloxy-1-naphthyl
(407) 4-(4-methylphenoxy)-1-naphthyl
(408) 6-N-methylsulfamoyl-1-naphthyl (409) 3-N,N-dimethylcarbamoyl-4-methoxy-1-naphthyl
(410) 5-methoxy-6-N-benzylsulfamoyl-1-naphthyl
(411) 3,6-di-N-phenylsulfamoyl-1-naphthyl
(412) benzyl
(413) 4-methoxybenzyl
(420)
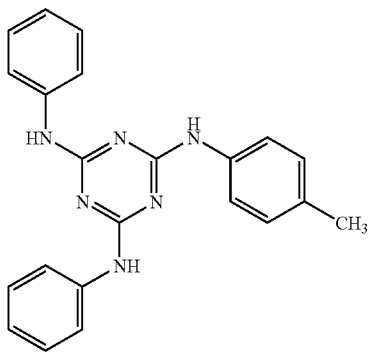
(421)
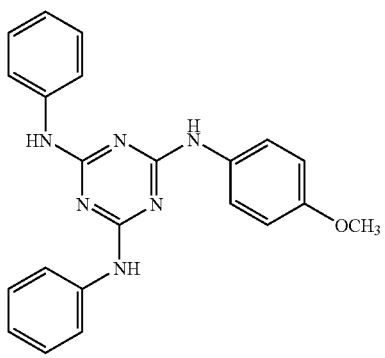
(422)
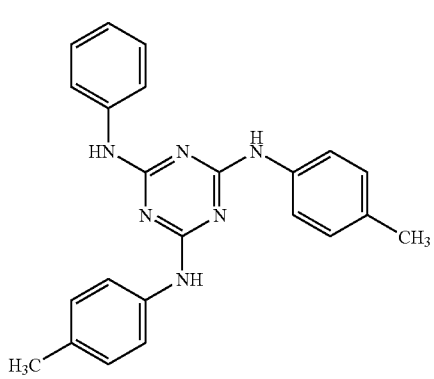
(423)
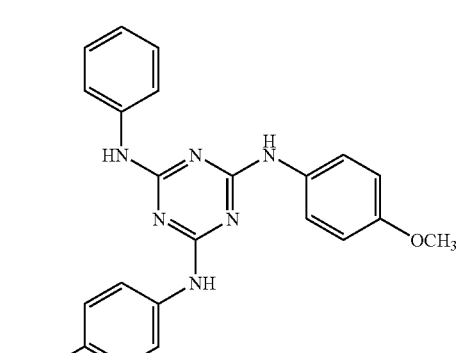
(424)–(426)
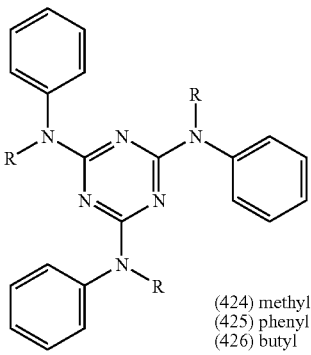
(424) methyl
(425) phenyl
(426) butyl
(427)
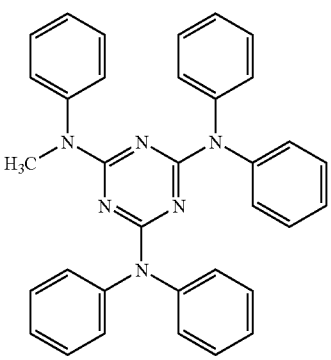
(428)
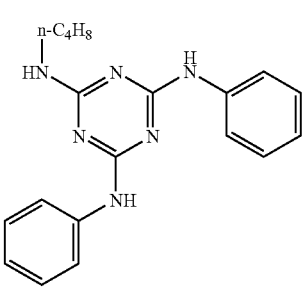
(429)
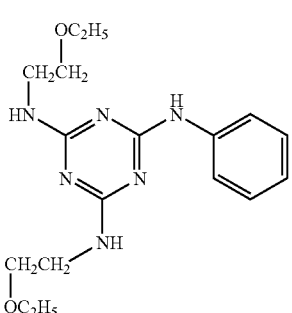
(430)–(431)
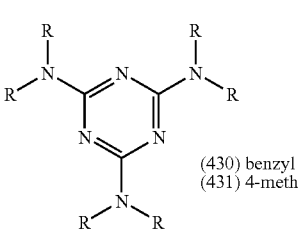
(430) benzyl
(431) 4-methoxybenzyl

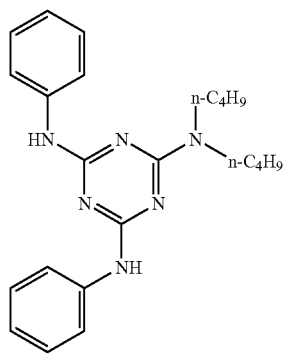
(438)
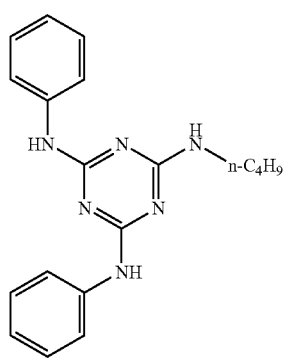
(439)
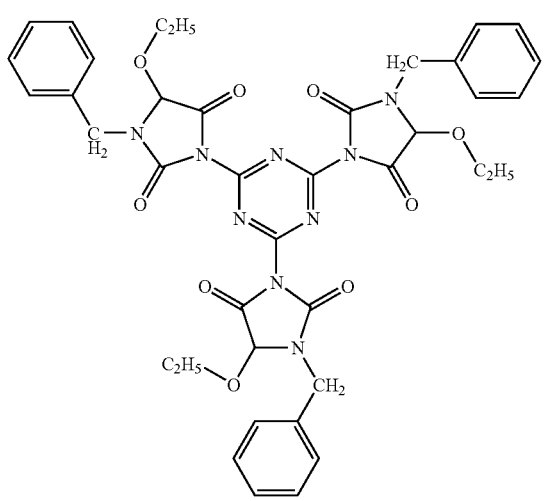
(440)
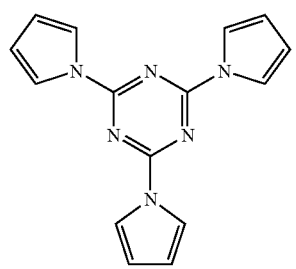
(441)
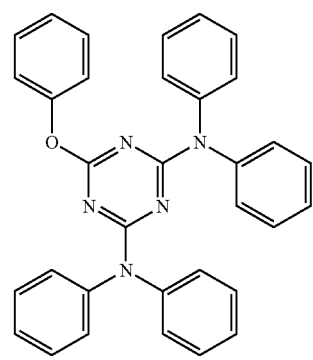
(442)
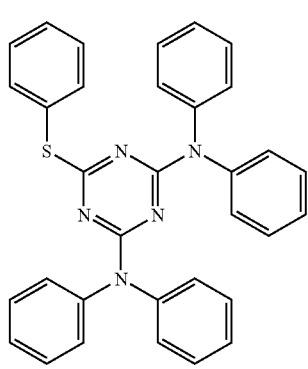
(443)
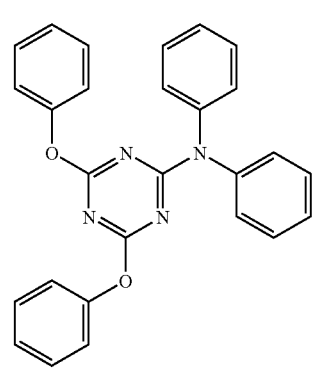
(444)
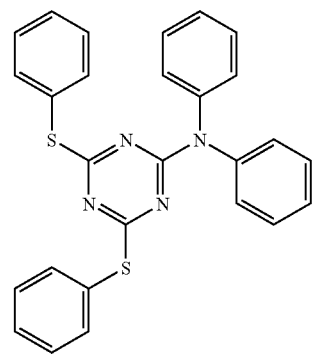
(445)

The retardation increasing agent other than the compound having 1,3,5-triazine ring preferably has a molecular structure in which there is no steric hindrance between conformations of two aromatic rings. The compound having at least two aromatic rings has a π-bonding plane constituted of seven or more carbon atoms. If there is no steric hindrance between conformations of the two aromatic rings, the rings belong to the same plane. According to the study of the present inventors, plural aromatic rings in the same plane increase retardation of a cellulose ester film. Examples of the retardation increasing agent other than the compound having 1,3,5-triazine ring are shown below. In each of the following examples, aromaticity of the aromatic ring is expressed by a circle in the ring.

(501)
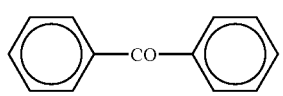

(502)
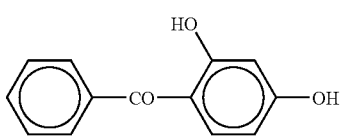

(503)
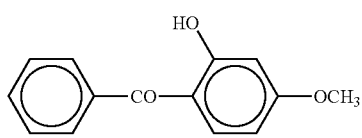

(504)
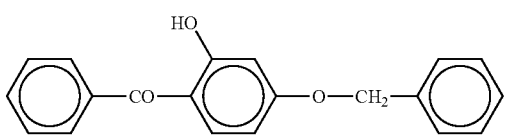

(505)
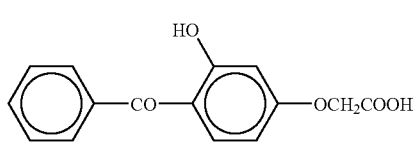

(506)
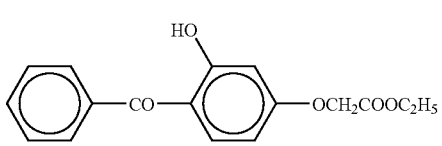

(507)
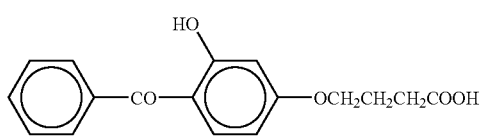

(508)
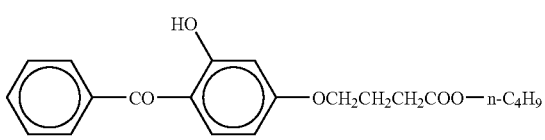

(509)
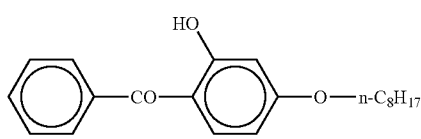

(510)
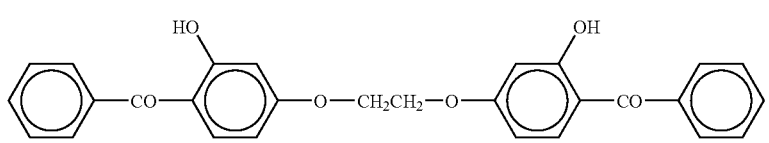

(511)
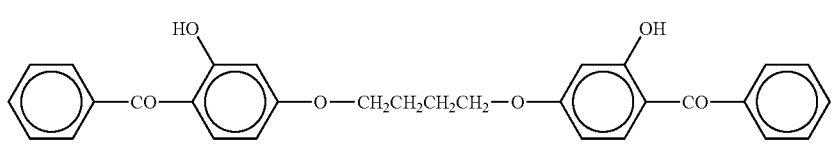

(512)
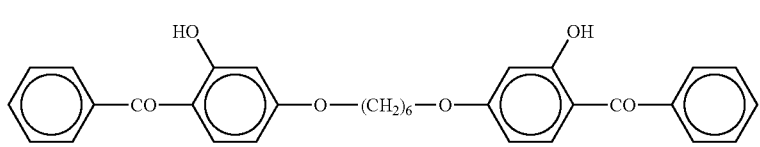

-continued
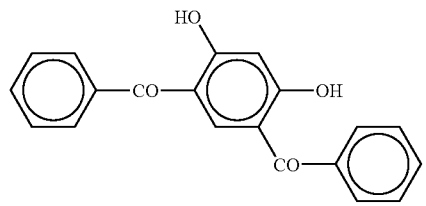
(513)
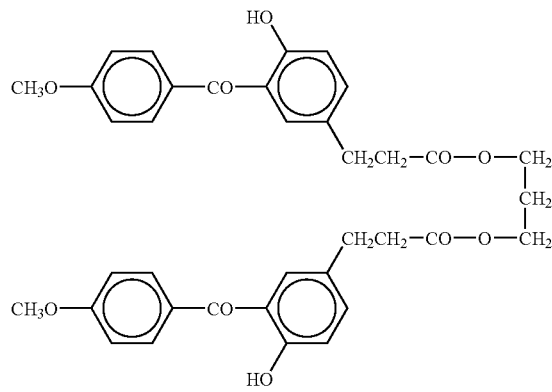
(514)
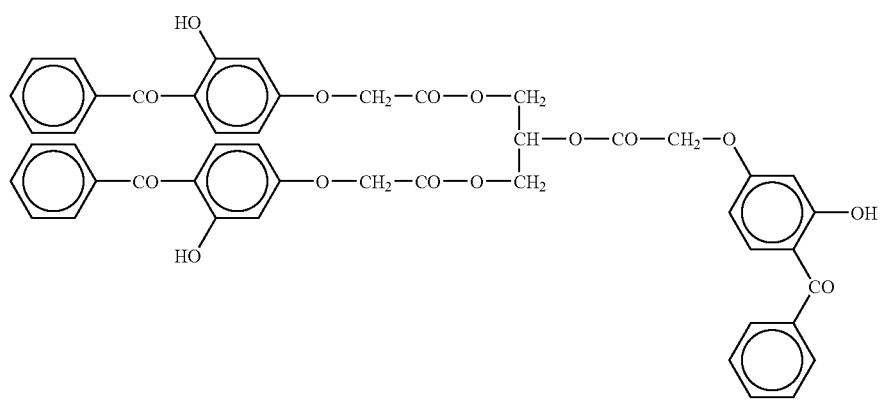
(515)
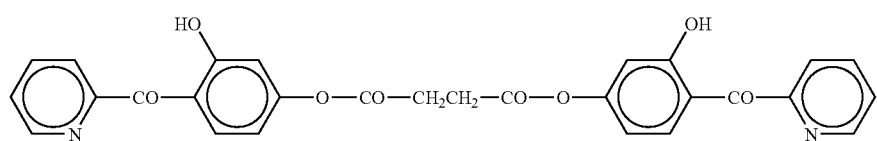
(516)
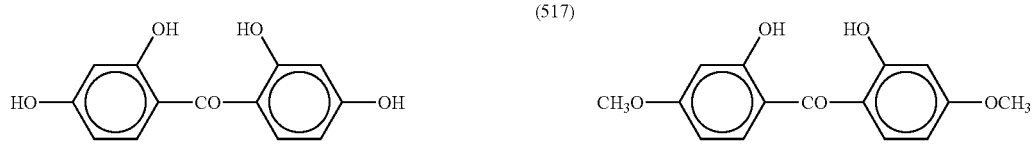
(517)
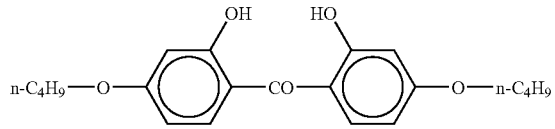
(518)
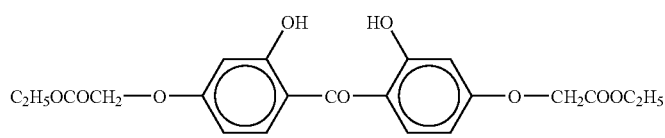
(519)
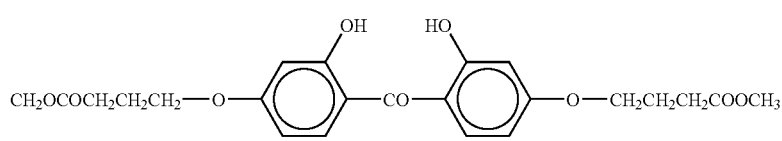
(520)
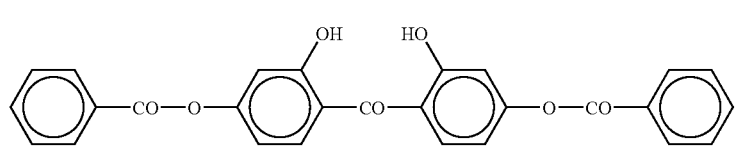
(521)
(522)

-continued
(523)
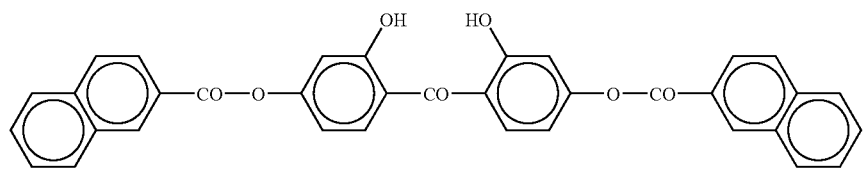
(524)
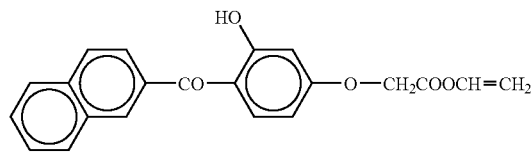
(525)
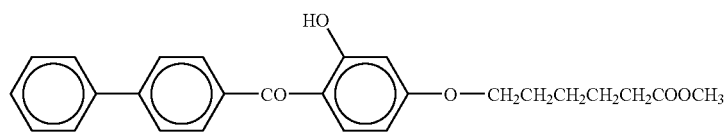
(526)
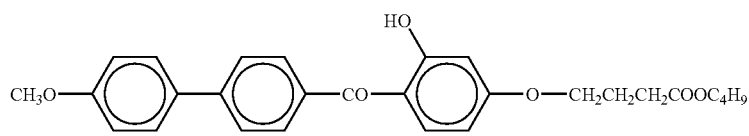
(527)
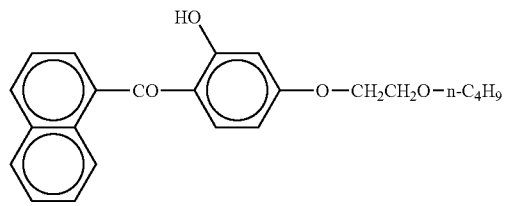
(528)
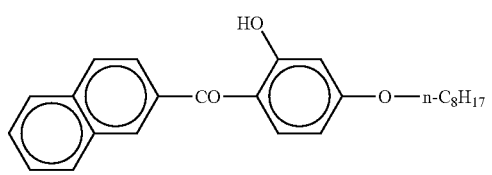
(529)
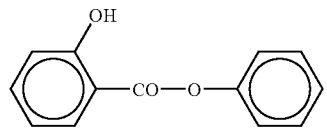
(530)
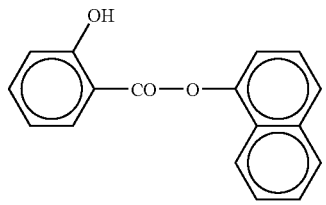
(531)
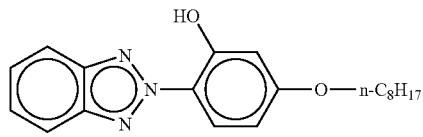
(532)
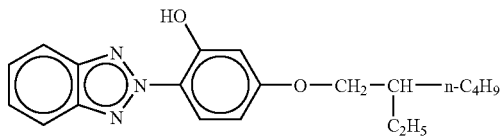
(533)
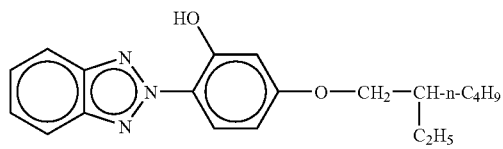
(534)
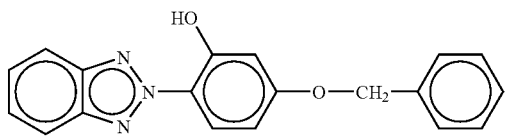
(535)
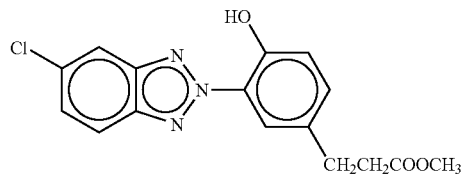
(536)
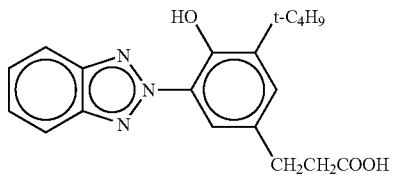

-continued
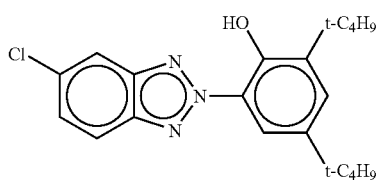
(537)
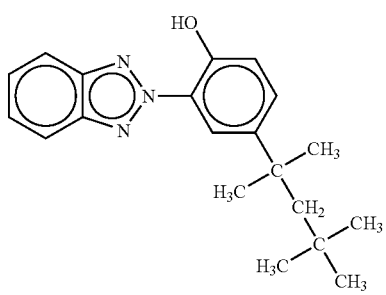
(538)
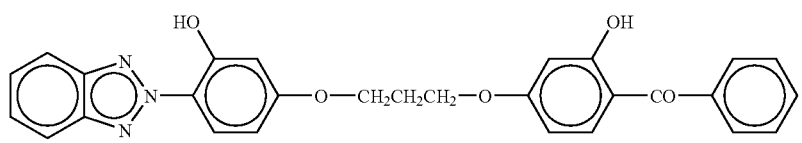
(539)
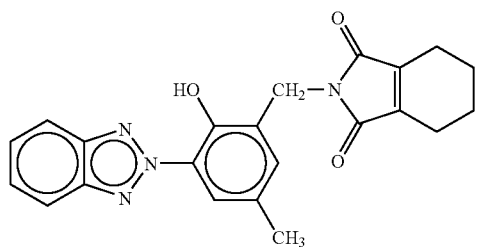
(540)
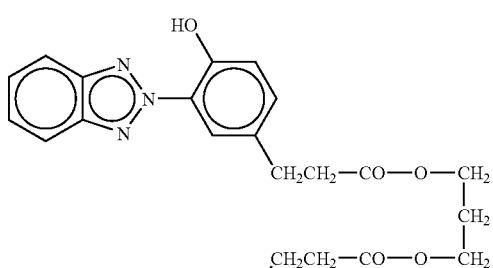
(541)
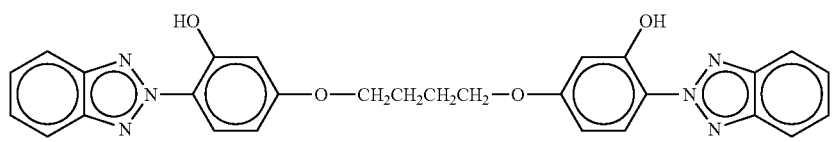
(542)
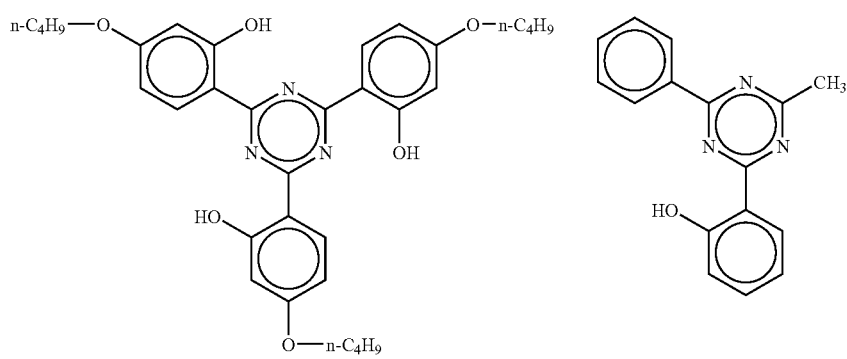
(543)
(544)
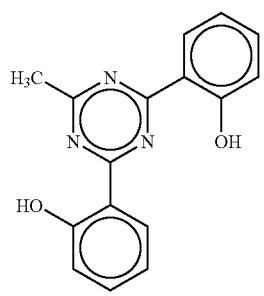
(545)

-continued
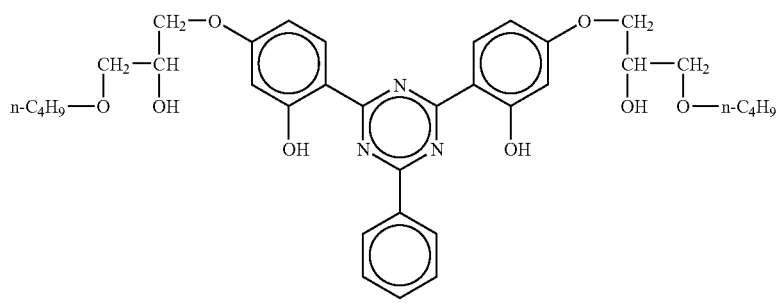
(546)
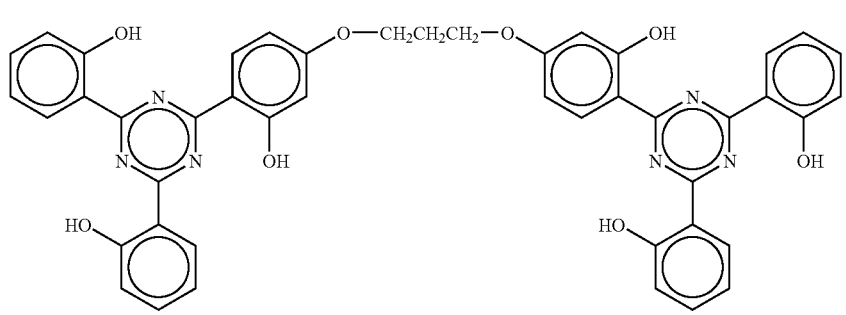
(547)
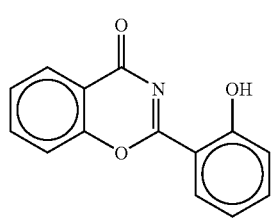
(548)
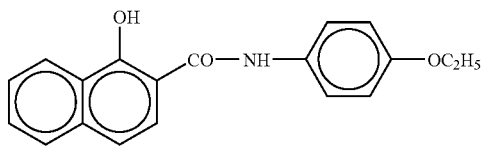
(549)
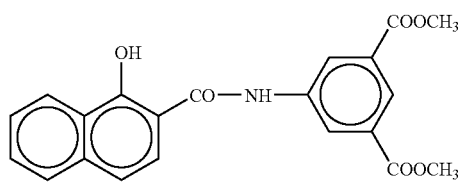
(550)
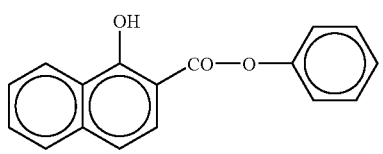
(551)
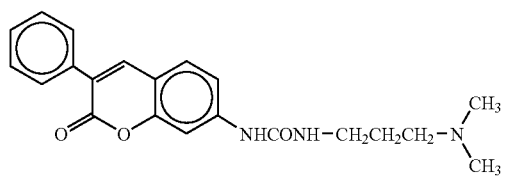
(552)
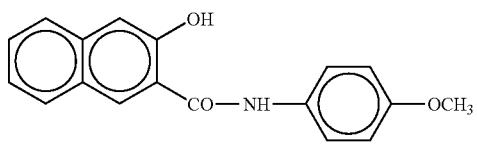
(553)
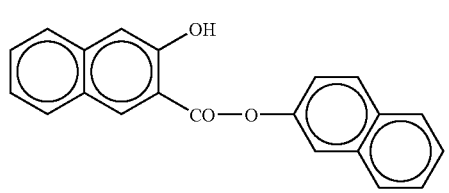
(554)
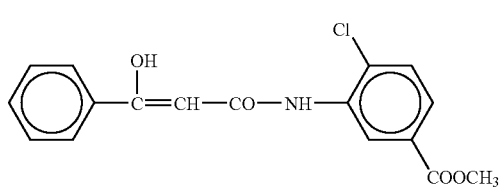
(555)
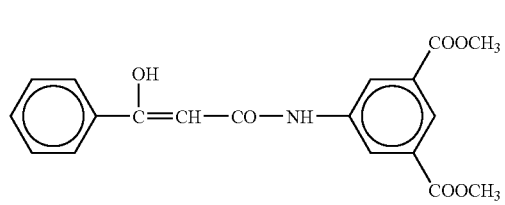
(556)
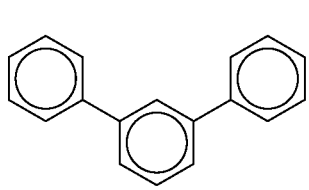
(557)

-continued
(558)
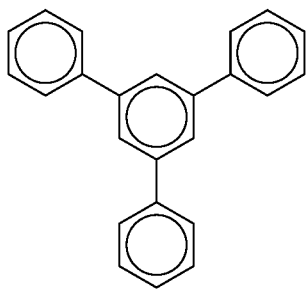
(559)
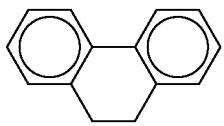
(560)
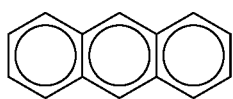
(561)
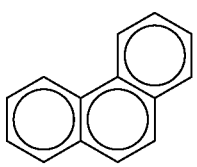
(562)
(563)
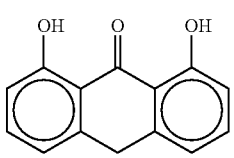
(564)
(565)
(566)
(567)
(568)
(569)
(570)
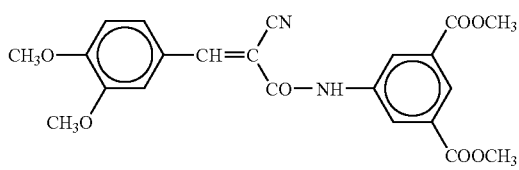
(571)
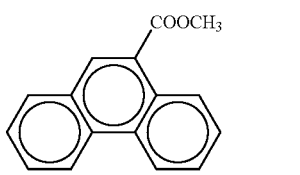

(572) 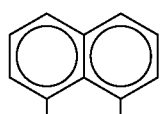
(573) 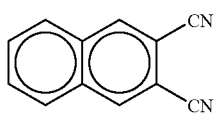
(574) 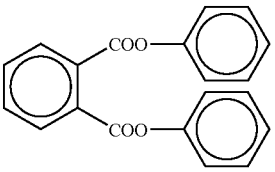
(575) 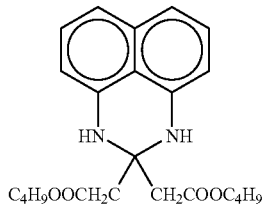
(576) 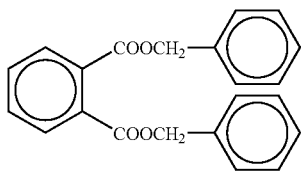
(577) 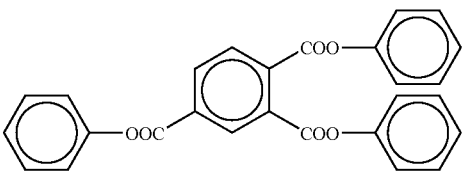
(578) 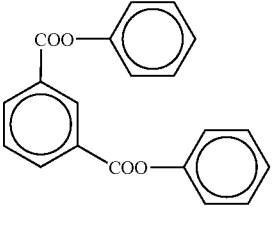
(579) 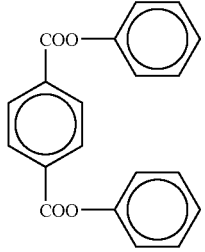
(580) 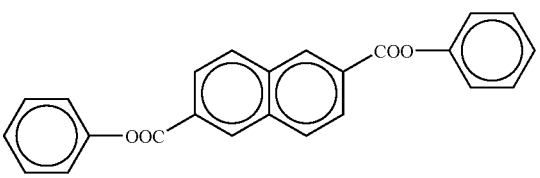
(581) 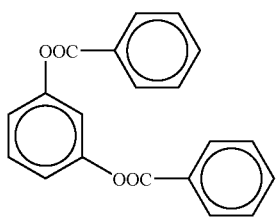
(582) 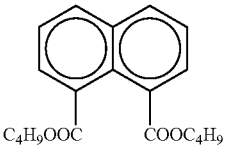
(583) 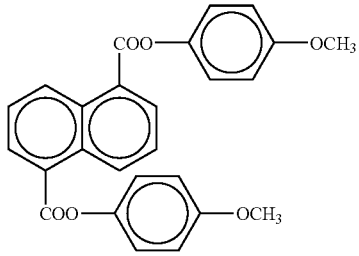
(584) 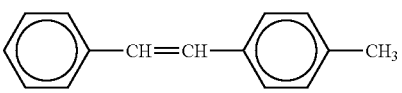
(585) 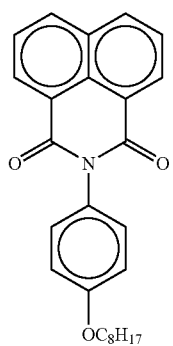

-continued
(586)
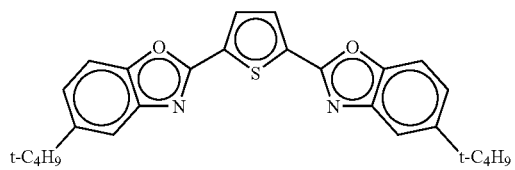
(587)
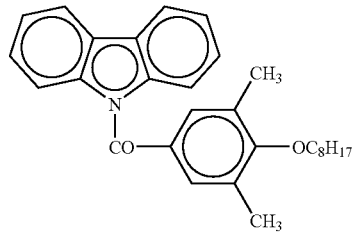
(588)
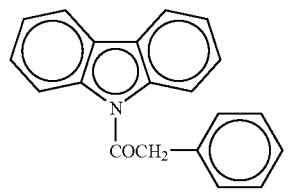
(589)
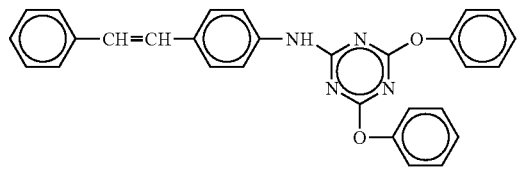
(590)
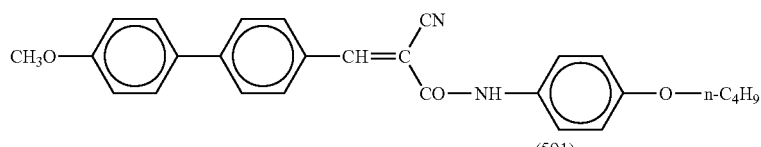
(591)
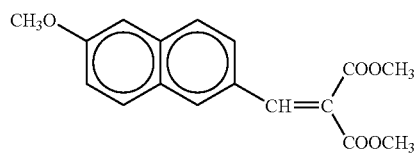
(592)
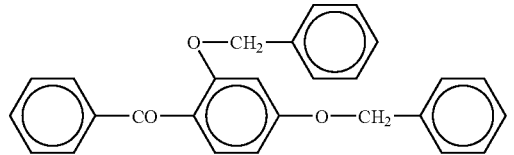
(593)
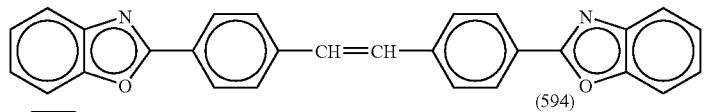
(594)
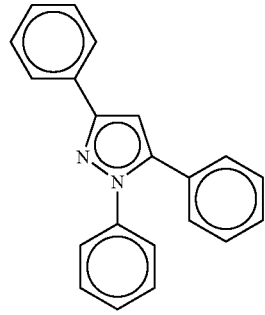
(595)
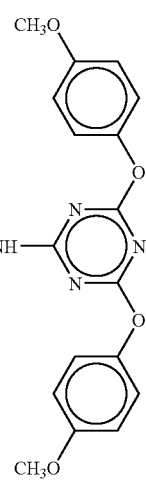
(596)
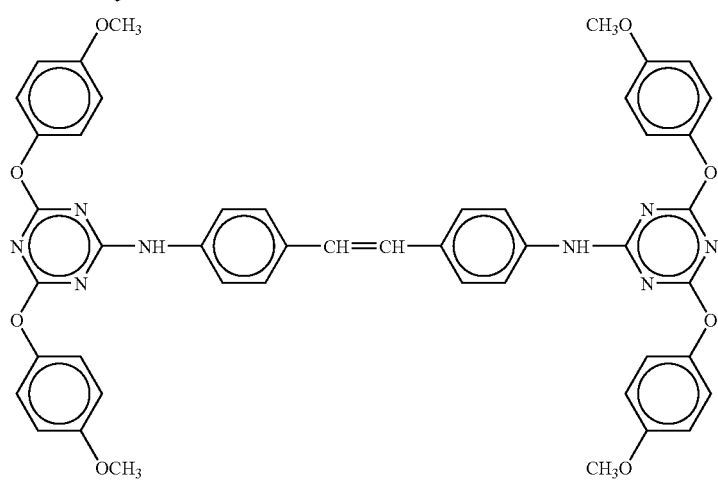

A melamine polymer can be used as the compound having 1,3,5-triazine ring. The melamine polymer is preferably prepared by the polymerization reaction between a carbonyl compound and a melamine compound. The reaction is represented by the formula (II):

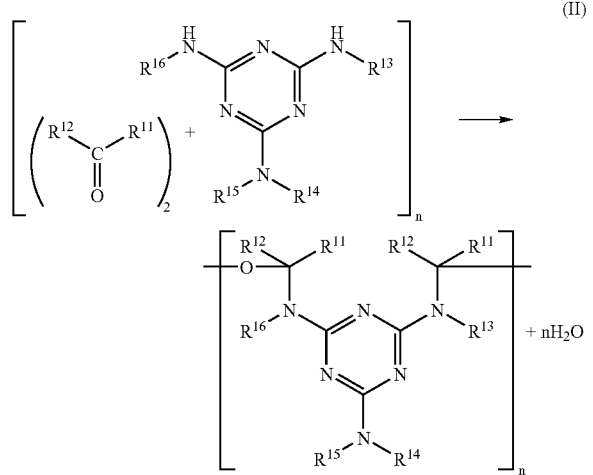

in which each of $R^{11}$, $R^{12}$, $R^{13}$, $R^{14}$, $R^{15}$ and $R^{16}$ is independently hydrogen, an alkyl group, an alkenyl group, an aryl group or a heterocyclic group. The definitions and the substituent groups of the alkyl group, the alkenyl group, the aryl group and the heterocyclic group are the same as those described about the formula (I).

The polymerization reaction between a carbonyl compound and a melamine compound can be carried out in the same manner as the known method for synthesizing a usual melamine resin (e.g., melamine-formaldehyde resin). A commercially available melamine polymer (melamine resin) is also usable.

The melamine polymer preferably has a molecular weight of 2,000 to 400,000.

Examples of the repeating units of the melamine polymers are shown below.

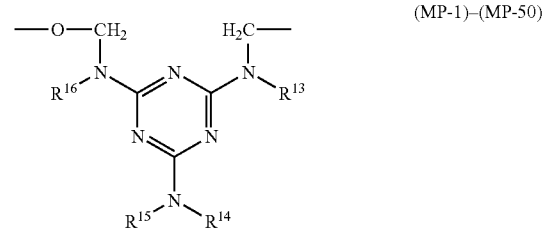
(MP-1)–(MP-50)

(MP-1) $R^{13},R^{14},R^{15},R^{16}$:$CH_2OH$
(MP-2) $R^{13},R^{14},R^{15},R^{16}$:$CH_2OCH_3$
(MP-3) $R^{13},R^{14},R^{15},R^{16}$:$CH_2O$-i-$C_4H_9$
(MP-4) $R^{13},R^{14},R^{15},R^{16}$:$CH_2O$-n-$C_4H_9$
(MP-5) $R^{13},R^{14},R^{15},R^{16}$:$CH_2NHCOCH=CH_2$
(MP-6) $R^{13},R^{14},R^{15},R^{16}$:$CH_2NHCO(CH_2)_7CH=CH(CH_2)_7CH_3$
(MP-7) $R^{13},R^{14},R^{15}$:$CH_2OH$; $R^{16}$:$CH_2OCH_3$
(MP-8) $R^{13},R^{14},R^{16}$:$CH_2OH$; $R^{15}$:$CH_2OCH_3$
(MP-9) $R^{13},R^{14}$:$CH_2OH$; $R^{15},R^{16}$:$CH_2OCH_3$
(MP-10) $R^{13},R^{16}$:$CH_2OH$; $R^{14},R^{15}$:$CH_2OCH_3$
(MP-11) $R^{13}$:$CH_2OH$; $R^{14},R^{15},R^{16}$:$CH_2OCH_3$
(MP-12) $R^{13},R^{14},R^{16}$:$CH_2OCH_3$; $R^{15}$:$CH_2OH$
(MP-13) $R^{13},R^{16}$:$CH_2OCH_3$; $R^{14},R^{15}$:$CH_2OH$
(MP-14) $R^{13},R^{14},R^{15}$:$CH_2OH$; $R^{16}$:$CH_2O$-i-$C_4H_9$
(MP-15) $R^{13},R^{14},R^{16}$:$CH_2OH$; $R^{15}$:$CH_2O$-i-$C_4H_9$
(MP-16) $R^{13},R^{14}$:$CH_2OH$; $R^{15},R^{16}$:$CH_2O$-i-$C_4H_9$
(MP-17) $R^{13},R^{16}$:$CH_2OH$; $R^{14},R^{15}$:$CH_2O$-i-$C_4H_9$
(MP-18) $R^{13}$:$CH_2OH$; $R^{14},R^{15},R^{16}$:$CH_2O$-i-$C_4H_9$
(MP-19) $R^{13},R^{14},R^{16}$:$CH_2O$-i-$C_4H_9$; $R^{15}$:$CH_2OH$
(MP-20) $R^{13},R^{16}$:$CH_2O$-i-$C_4H_9$; $R^{14},R^{15}$:$CH_2OH$
(MP-21) $R^{13},R^{14},R^{15}$:$CH_2OH$; $R^{16}$:$CH_2O$-n-$C_4H_9$
(MP-22) $R^{13},R^{14},R^{16}$:$CH_2OH$; $R^{15}$:$CH_2O$-n-$C_4H_9$
(MP-23) $R^{13},R^{14}$:$CH_2OH$; $R^{15},R^{16}$:$CH_2O$-n-$C_4H_9$
(MP-24) $R^{13},R^{16}$:$CH_2OH$; $R^{14},R^{15}$:$CH_2O$-n-$C_4H_9$
(MP-25) $R^{13}$:$CH_2OH$; $R^{14},R^{15},R^{16}$:$CH_2O$-n-$C_4H_9$
(MP-26) $R^{13},R^{14},R^{16}$:$CH_2O$-n-$C_4H_9$; $R^{15}$:$CH_2OH$
(MP-27) $R^{13},R^{16}$:$CH_2O$-n-$C_4H_9$; $R^{14},R^{15}$:$CH_2OH$
(MP-28) $R^{13},R^{14}$:$CH_2OH$; $R^{15}$:$CH_2OCH_3$; $R^{16}$:$CH_2O$-n-$C_4H_9$
(MP-29) $R^{13},R^{14}$:$CH_2OH$; $R^{15}$:$CH_2O$-n-$C_4H_9$; $R^{16}$:$CH_2OCH_3$
(MP-30) $R^{13},R^{16}$:$CH_2OH$; $R^{14}$:$CH_2OCH_3$; $R^{15}$:$CH_2O$-n-$C_4H_9$
(MP-31) $R^{13}$:$CH_2OH$; $R^{14},R^{15}$:$CH_2OCH_3$; $R^{16}$:$CH_2O$-n-$C_4H_9$
(MP-32) $R^{13}$:$CH_2OH$; $R^{14},R^{16}$:$CH_2OCH_3$; $R^{15}$:$CH_2O$-n-$C_4H_9$
(MP-33) $R^{13}$:$CH_2OH$; $R^{14}$:$CH_2OCH_3$; $R^{15},R^{16}$:$CH_2O$-n-$C_4H_9$
(MP-34) $R^{13}$:$CH_2OH$; $R^{14},R^{15}$:$CH_2O$-n-$C_4H_9$; $R^{16}$:$CH_2OCH_3$
(MP-35) $R^{13},R^{14}$:$CH_2OCH_3$; $R^{15}$:$CH_2OH$; $R^{16}$:$CH_2O$-n-$C_4H_9$
(MP-36) $R^{13},R^{16}$:$CH_2OCH_3$; $R^{14}$:$CH_2OH$; $R^{15}$:$CH_2O$-n-$C_4H_9$
(MP-37) $R^{13}$:$CH_2OCH_3$; $R^{14},R^{15}$:$CH_2OH$; $R^{16}$:$CH_2O$-n-$C_4H_9$
(MP-38) $R^{13},R^{16}$:$CH_2O$-n-$C_4H_9$; $R^{14}$:$CH_2OCH_3$; $R^{15}$:$CH_2OH$
(MP-39) $R^{13}$:$CH_2OH$; $R^{14}$:$CH_2OCH_3$; $R^{15}$:$CH_2O$-n-$C_4H_9$; $R^{16}$:$CH_2NHCOCH=CH_2$
(MP-40) $R^{13}$:$CH_2OH$; $R^{14}$:$CH_2OCH_3$; $R^{15}$:$CH_2NHCOCH=CH_2$; $R^{16}$:$CH_2O$-n-$C_4H_9$
(MP-41) $R^{13}$:$CH_2OH$; $R^{14}$:$CH_2O$-n-$C_4H_9$; $R^{15}$:$CH_2NHCOCH=CH_2$; $R^{16}$:$CH_2OCH_3$
(MP-42) $R^{13}$:$CH_2OCH_3$; $R^{14}$:$CH_2OH$; $R^{15}$:$CH_2O$-n-$C_4H_9$; $R^{16}$:$CH_2NHCOCH=CH_2$
(MP-43) $R^{13}$:$CH_2OCH_3$; $R^{14}$:$CH_2OH$; $R^{15}$:$CH_2NHCOCH=CH_2$; $R^{16}$:$CH_2O$-n-$C_4H_9$
(MP-44) $R^{13}$:$CH_2O$-n-$C_4H_9$; $R^{14}$:$CH_2OCH_3$; $R^{15}$:$CH_2OH$; $R^{16}$:$CH_2NHCOCH=CH_2$
(MP-45) $R^{13}$:$CH_2OH$; $R^{14}$:$CH_2OCH_3$; $R^{15}$:$CH_2NHCO(CH_2)_7CH=CH(CH_2)_7CH_3$; $R^{16}$:$CH_2NHCOCH=CH_2$
(MP-46) $R^{13}$:$CH_2OH$; $R^{14}$:$CH_2OCH_3$; $R^{15}$:$CH_2NHCOCH=CH_2$; $R^{16}$:$CH_2NHCO(CH_2)_7CH=CH(CH_2)_7CH_3$
(MP-47) $R^{13}$:$CH_2OH$; $R^{14}$:$CH_2NHCO(CH_2)_7CH=CH(CH_2)_7CH_3$; $R^{15}$:$CH_2NHCOCH=CH_2$; $R^{16}$:$CH_2OCH_3$
(MP-48) $R^{13}$:$CH_2OCH_3$; $R^{14}$:$CH_2OH$; $R^{15}$:$CH_2NHCO(CH_2)_7CH=CH(CH_2)_7CH_3$; $R^{16}$:$CH_2NHCOCH=CH_2$
(MP-49) $R^{13}$:$CH_2OCH_3$; $R^{14}$:$CH_2OH$; $R^{15}$:$CH_2NHCOCH=CH_2$; $R^{16}$:$CH_2NHCO(CH_2)_7CH=CH(CH_2)_7CH_3$ (MP-50) $R^{13}$:CH$_2$NHCO(CH$_2$)$_7$CH=CH(CH$_2$)$_7$CH$_3$; $R^{14}$:CH$_2$OCH$_3$; $R^{15}$:CH$_2$OH; $R^{16}$:CH$_2$NHCOCH=CH$_2$ (MP-51)–(MP-100)

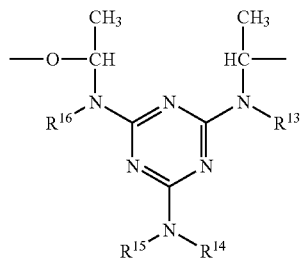

(MP-51) $R^{13},R^{14},R^{15},R^{16}$:CH$_2$OH
(MP-52) $R^{13},R^{14},R^{15},R^{16}$:CH$_2$OCH$_3$
(MP-53) $R^{13},R^{14},R^{15},R^{16}$:CH$_2$O-i-C$_4$H$_9$
(MP-54) $R^{13},R^{14},R^{15},R^{16}$:CH$_2$O-n-C$_4$H$_9$
(MP-55) $R^{13},R^{14},R^{15},R^{16}$:CH$_2$NHCOCH=CH$_2$
(MP-56) $R^{13},R^{14},R^{15},R^{16}$:CH$_2$NHCO(CH$_2$)$_7$CH=CH(CH$_2$)$_7$CH$_3$
(MP-57) $R^{13},R^{14},R^{15}$:CH$_2$OH; $R^{16}$:CH$_2$OCH$_3$
(MP-58) $R^{13},R^{14},R^{16}$:CH$_2$OH; $R^{15}$:CH$_2$OCH$_3$
(MP-59) $R^{13},R^{14}$:CH$_2$OH; $R^{15},R^{16}$:CH$_2$OCH$_3$
(MP-60) $R^{13},R^{16}$:CH$_2$OH; $R^{14},R^{15}$:CH$_2$OCH$_3$
(MP-61) $R^{13}$:CH$_2$OH; $R^{14},R^{15},R^{16}$:CH$_2$OCH$_3$
(MP-62) $R^{13},R^{14},R^{16}$:CH$_2$OCH$_3$; $R^{15}$:CH$_2$OH
(MP-63) $R^{13},R^{16}$:CH$_2$OCH$_3$; $R^{14},R^{15}$:CH$_2$OH
(MP-64) $R^{13},R^{14},R^{15}$:CH$_2$OH; $R^{16}$:CH$_2$O-i-C$_4$H$_9$
(MP-65) $R^{13},R^{14},R^{16}$:CH$_2$OH; $R^{15}$:CH$_2$O-i-C$_4$H$_9$
(MP-66) $R^{13},R^{14}$:CH$_2$OH; $R^{15},R^{16}$:CH$_2$O-i-C$_4$H$_9$
(MP-67) $R^{13},R^{16}$:CH$_2$OH; $R^{14},R^{15}$:CH$_2$O-i-C$_4$H$_9$
(MP-68) $R^{13}$:CH$_2$OH; $R^{14},R^{15},R^{16}$:CH$_2$O-i-C$_4$H$_9$
(MP-69) $R^{13},R^{14},R^{16}$:CH$_2$O-i-C$_4$H$_9$; $R^{15}$:CH$_2$OH
(MP-70) $R^{13},R^{16}$:CH$_2$O-i-C$_4$H$_9$; $R^{14},R^{15}$:CH$_2$OH
(MP-71) $R^{13},R^{14},R^{15}$:CH$_2$OH; $R^{16}$:CH$_2$O-n-C$_4$H$_9$
(MP-72) $R^{13},R^{14},R^{16}$:CH$_2$OH; $R^{15}$:CH$_2$O-n-C$_4$H$_9$
(MP-73) $R^{13},R^{14}$:CH$_2$OH; $R^{15},R^{16}$:CH$_2$O-n-C$_4$H$_9$
(MP-74) $R^{13},R^{16}$:CH$_2$OH; $R^{14},R^{15}$:CH$_2$O-n-C$_4$H$_9$
(MP-75) $R^{13}$:CH$_2$OH; $R^{14},R^{15},R^{16}$:CH$_2$O-n-C$_4$H$_9$
(MP-76) $R^{13},R^{14},R^{16}$:CH$_2$O-n-C$_4$H9; $R^{15}$:CH$_2$OH
(MP-77) $R^{13},R^{16}$:CH$_2$O-n-C$_4$H$_9$; $R^{14},R^{15}$:CH$_2$OH
(MP-78) $R^{13},R^{14}$:CH$_2$OH; $R^{15}$:CH$_2$OCH$_3$; $R^{16}$:CH$_2$O-n-C$_4$H$_9$
(MP-79) $R^{13},R^{14}$:CH$_2$OH; $R^{15}$:CH$_2$O-n-C$_4$H$_9$; $R^{16}$:CH$_2$OCH$_3$
(MP-80) $R^{13},R^{16}$:CH$_2$OH; $R^{14}$:CH$_2$OCH$_3$; $R^{15}$:CH$_2$O-n-C$_4$H$_9$
(MP-81) $R^{13}$:CH$_2$OH; $R^{14},R^{15}$:CH$_2$OCH$_3$; $R^{16}$:CH$_2$O-n-C$_4$H$_9$
(MP-82) $R^{13}$:CH$_2$OH; $R^{14},R^{16}$:CH$_2$OCH$_3$; $R^{15}$:CH$_2$O-n-C$_4$H$_9$
(MP-83) $R^{13},R^{15}$:CH$_2$OH; $R^{14}$:CH$_2$OCH$_3$; $R^{16}$:CH$_2$O-n-C$_4$H$_9$
(MP-84) $R^{13}$:CH$_2$OH; $R^{14},R^{15}$:CH$_2$O-n-C$_4$H$_9$; $R^{16}$:CH$_2$OCH$_3$
(MP-85) $R^{13},R^{14}$:CH$_2$OCH$_3$; $R^{15}$:CH$_2$OH; $R^{16}$:CH$_2$O-n-C$_4$H$_9$
(MP-86) $R^{13},R^{16}$:CH$_2$OCH$_3$; $R^{14}$:CH$_2$OH; $R^{15}$:CH$_2$O-n-C$_4$H$_9$
(MP-87) $R^{13}$:CH$_2$OCH$_3$; $R^{14},R^{15}$:CH$_2$OH; $R^{16}$:CH$_2$O-n-C$_4$H$_9$
(MP-88) $R^{13},R^{16}$:CH$_2$O-n-C$_4$H$_9$; $R^{14}$:CH$_2$OCH$_3$; $R^{15}$:CH$_2$OH
(MP-89) $R^{13}$:CH$_2$OH; $R^{14}$:CH$_2$OCH$_3$; $R^{15}$:CH$_2$O-n-C$_4$H$_9$; $R^{16}$:CH$_2$NHCOCH=CH$_2$
(MP-90) $R^{13}$:CH$_2$OH; $R^{14}$:CH$_2$OCH$_3$; $R^{15}$:CH$_2$NHCOCH=CH$_2$; $R^{16}$:CH$_2$O-n-C$_4$H$_9$
(MP-91) $R^{13}$:CH$_2$OH; $R^{14}$:CH$_2$O-n-C$_4$H$_9$; $R^{15}$:CH$_2$NHCOCH=CH$_2$; $R^{16}$:CH$_2$OCH$_3$
(MP-92) $R^{13}$:CH$_2$OCH$_3$; $R^{14}$:CH$_2$OH; $R^{15}$:CH$_2$O-n-C$_4$H$_9$; $R^{16}$:CH$_2$NHCOCH=CH$_2$
(MP-93) $R^{13}$:CH$_2$OCH$_3$; $R^{14}$:CH$_2$OH; $R^{15}$:CH$_2$NHCOCH=CH$_2$; $R^{16}$:CH$_2$O-n-C$_4$H$_9$
(MP-94) $R^{13}$:CH$_2$O-n-C$_4$H$_9$; $R^{14}$:CH$_2$OCH$_3$; $R^{15}$:CH$_2$OH; $R^{16}$:CH$_2$NHCOCH=CH$_2$
(MP-95) $R^{13}$:CH$_2$OH; $R^{14}$:CH$_2$OCH$_3$; $R^{15}$:CH$_2$NHCO(CH$_2$)$_7$CH=CH(CH$_2$)$_7$CH$_3$; $R^{16}$:CH$_2$NHCOCH=CH$_2$
(MP-96) $R^{13}$:CH$_2$OH; $R^{14}$:CH$_2$OCH$_3$; $R^{15}$:CH$_2$NHCOCH=CH$_2$; $R^{16}$:CH$_2$NHCO(CH$_2$)$_7$CH=CH(CH$_2$)$_7$CH$_3$
(MP-97) $R^{13}$:CH$_2$OH; $R^{14}$:CH$_2$NHCO(CH$_2$)$_7$CH=CH(CH$_2$)$_7$CH$_3$; $R^{15}$:CH$_2$NHCOCH=CH$_2$; $R^{16}$:CH$_2$OCH$_3$
(MP-98) $R^{13}$:CH$_2$OCH$_3$; $R^{14}$:CH$_2$OH; $R^{15}$:CH$_2$NHCO(CH$_2$)$_7$CH=CH(CH$_2$)$_7$CH$_3$; $R^{16}$:CH$_2$NHCOCH=CH$_2$
(MP-99) $R^{13}$:CH$_2$OCH$_3$; $R^{14}$:CH$_2$OH; $R^{15}$:CH$_2$NHCOCH=CH$_2$; $R^{16}$: CH$_2$NHCO(CH$_2$)$_7$CH=CH(CH$_2$)$_7$CH$_3$
(MP-100) $R^{13}$:CH$_2$NHCO(CH$_2$)$_7$CH=CH(CH$_2$)$_7$CH$_3$; $R^{14}$:CH$_2$OCH$_3$; $R^{15}$:CH$_2$OH; $R^{16}$: CH$_2$NHCOCH=CH$_2$ (MP-101)–(MP-150)

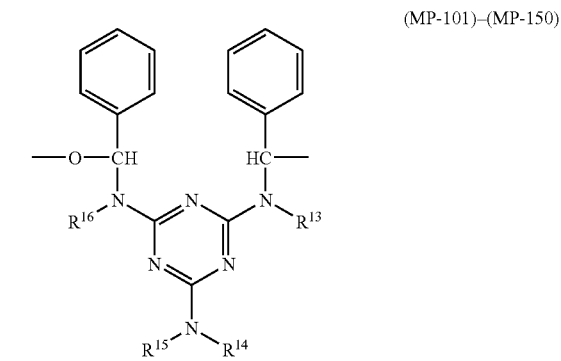

(MP-101) $R^{13},R^{14},R^{15},R^{16}$:CH$_2$OH
(MP-102) $R^{13},R^{14},R^{15},R^{16}$:CH$_2$OCH$_3$
(MP-103) $R^{13},R^{14},R^{15},R^{16}$:CH$_2$O-i-C$_4$H$_9$
(MP-104) $R^{13},R^{14},R^{15},R^{16}$:CH$_2$O-n-C$_4$H$_9$
(MP-105) $R^{13},R^{14},R^{15},R^{16}$:CH$_2$NHCOCH=CH$_2$
(MP-106) $R^{13},R^{14},R^{15},R^{16}$:CH$_2$NHCO(CH$_2$)$_7$CH=CH(CH$_2$)$_7$CH$_3$
(MP-107) $R^{13},R^{14},R^{15}$:CH$_2$OH; $R^{16}$:CH$_2$OCH$_3$
(MP-108) $R^{13},R^{14},R^{16}$:CH$_2$OH; $R^{15}$:CH$_2$OCH$_3$
(MP-109) $R^{13},R^{14}$:CH$_2$OH; $R^{15},R^{16}$:CH$_2$OCH$_3$
(MP-110) $R^{13},R^{16}$:CH$_2$OH; $R^{14},R^{15}$:CH$_2$OCH$_3$
(MP-111) $R^{13}$:CH$_2$OH; $R^{14},R^{15},R^{16}$:CH$_2$OCH$_3$
(MP-112) $R^{13},R^{14},R^{16}$:CH$_2$OCH$_3$; $R^{15}$:CH$_2$OH
(MP-113) $R^{13},R^{16}$:CH$_2$OCH$_3$; $R^{14},R^{15}$:CH$_2$OH
(MP-114) $R^{13},R^{14},R^{15}$:CH$_2$OH; $R^{16}$:CH$_2$O-i-C$_4$H$_9$ (MP-115) $R^{13},R^{14},R^{16}$:CH$_2$OH; $R^{15}$:CH$_2$O-i-C$_4$H$_9$
(MP-116) $R^{13},R^{14}$:CH$_2$OH; $R^{15},R^{16}$:CH$_2$O-i-C$_4$H$_9$
(MP-117) $R^{13},R^{16}$:CH$_2$OH; $R^{14},R^{15}$:CH$_2$O-i-C$_4$H$_9$
(MP-118) $R^{13}$:CH$_2$OH; $R^{14},R^{15},R^{16}$:CH$_2$O-i-C$_4$H$_9$
(MP-119) $R^{13},R^{14},R^{16}$:CH$_2$O-i-C$_4$H$_9$; $R^{15}$:CH$_2$OH
(MP-120) $R^{13},R^{16}$:CH$_2$O-i-C$_4$H$_9$; $R^{14},R^{15}$:CH$_2$OH
(MP-121) $R^{13},R^{14},R^{15}$:CH$_2$OH; $R^{16}$:CH$_2$O-n-C$_4$H$_9$
(MP-122) $R^{13},R^{14},R^{16}$:CH$_2$OH; $R^{15}$:CH$_2$O-n-C$_4$H$_9$
(MP-123) $R^{13},R^{14}$:CH$_2$OH; $R^{15},R^{16}$:CH$_2$O-n-C$_4$H$_9$
(MP-124) $R^{13},R^{16}$:CH$_2$OH; $R^{14},R^{15}$:CH$_2$O-n-C$_4$H$_9$
(MP-125) $R^{13}$:CH$_2$OH; $R^{14},R^{15},R^{16}$:CH$_2$O-n-C$_4$H$_9$
(MP-126) $R^{13},R^{14},R^{16}$:CH$_2$O-n-C$_4$H$_9$; $R^{15}$:CH$_2$OH
(MP-127) $R^{13},R^{16}$:CH$_2$O-n-C$_4$H$_9$; $R^{14},R^{15}$:CH$_2$OH
(MP-128) $R^{13},R^{14}$:CH$_2$OH; $R^{15}$:CH$_2$OCH$_3$; $R^{16}$:CH$_2$O-n-C$_4$H$_9$
(MP-129) $R^{13},R^{14}$:CH$_2$OH; $R^{15}$:CH$_2$O-n-C$_4$H$_9$; $R^{16}$:CH$_2$OCH$_3$
(MP-130) $R^{13},R^{16}$:CH$_2$OH; $R^{14}$:CH$_2$OCH$_3$; $R^{15}$:CH$_2$O-n-C$_4$H$_9$
(MP-131) $R^{13}$:CH$_2$OH; $R^{14},R^{15}$:CH$_2$OCH$_3$; $R^{16}$:CH$_2$O-n-C$_4$H$_9$
(MP-132) $R^{13}$:CH$_2$OH; $R^{14},R^{16}$:CH$_2$OCH$_3$; $R^{15}$:CH$_2$O-n-C$_4$H$_9$
(MP-133) $R^{13}$:CH$_2$OH; $R^{14}$:CH$_2$OCH$_3$; $R^{15},R^{16}$:CH$_2$O-n-C$_4$H$_9$
(MP-134) $R^{13}$:CH$_2$OH; $R^{14},R^{15}$:CH$_2$O-n-C$_4$H$_9$; $R^{16}$:CH$_2$OCH$_3$
(MP-135) $R^{13},R^{14}$:CH$_2$OCH$_3$; $R^{15}$:CH$_2$OH; $R^{16}$:CH$_2$O-n-C$_4$H$_9$
(MP-136) $R^{13},R^{16}$:CH$_2$OCH$_3$; $R^{14}$:CH$_2$OH; $R^{15}$:CH$_2$O-n-C$_4$H$_9$
(MP-137) $R^{13}$:CH$_2$OCH$_3$; $R^{14},R^{15}$:CH$_2$OH; $R^{16}$:CH$_2$O-n-C$_4$H$_9$
(MP-138) $R^{13},R^{16}$:CH$_2$O-n-C$_4$H$_9$; $R^{14}$:CH$_2$OCH$_3$; $R^{15}$:CH$_2$OH
(MP-139) $R^{13}$:CH$_2$OH; $R^{14}$:CH$_2$OCH$_3$; $R^{15}$:CH$_2$O-n-C$_4$H$_9$; $R^{16}$:CH$_2$NHCOCH=CH$_2$
(MP-140) $R^{13}$:CH$_2$OH; $R^{14}$:CH$_2$OCH$_3$; $R^{15}$:CH$_2$NHCOCH=CH$_2$; $R^{16}$:CH$_2$O-n-C$_4$H$_9$
(MP-141) $R^{13}$:CH$_2$OH; $R^{14}$:CH$_2$O-n-C$_4$H$_9$; $R^{15}$:CH$_2$NHCOCH=CH$_2$; $R^{16}$:CH$_2$OCH$_3$
(MP-142) $R^{13}$:CH$_2$OCH$_3$; $R^{14}$:CH$_2$OH; $R^{15}$:CH$_2$O-n-C$_4$H$_9$; $R^{16}$:CH$_2$NHCOCH=CH$_2$
(MP-143) $R^{13}$:CH$_2$OCH$_3$; $R^{14}$:CH$_2$OH; $R^{15}$:CH$_2$NHCOCH=CH$_2$; $R^{16}$:CH$_2$O-n-C$_4$H$_9$
(MP-144) $R^{13}$:CH$_2$O-n-C$_4$H$_9$; $R^{14}$:CH$_2$OCH$_3$; $R^{15}$:CH$_2$OH; $R^{16}$:CH$_2$NHCOCH=CH$_2$
(MP-145) $R^{13}$:CH$_2$OH; $R^{14}$:CH$_2$OCH$_3$; $R^{15}$:CH$_2$NHCO(CH$_2$)$_7$CH=CH(CH$_2$)$_7$CH$_3$; $R^{16}$:CH$_2$NHCOCH=CH$_2$
(MP-146) $R^{13}$:CH$_2$OH; $R^{14}$:CH$_2$OCH$_3$; $R^{15}$:CH$_2$NHCOCH=CH$_2$; $R^{16}$: CH$_2$NHCO(CH$_2$)$_7$CH=CH(CH$_2$)$_7$CH$_3$
(MP-147) $R^{13}$:CH$_2$OH; $R^{14}$:CH$_2$NHCO(CH$_2$)$_7$CH=CH(CH$_2$)$_7$CH$_3$; $R^{15}$:CH$_2$NHCOCH=CH$_2$; $R^{16}$:CH$_2$OCH$_3$
(MP-148) $R^{13}$:CH$_2$OCH$_3$; $R^{14}$:CH$_2$OH; $R^{15}$:CH$_2$NHCO(CH$_2$)$_7$CH=CH(CH$_2$)$_7$CH$_3$; $R^{16}$:CH$_2$NHCOCH=CH$_2$
(MP-149) $R^{13}$:CH$_2$OCH$_3$; $R^{14}$:CH$_2$OH; $R^{15}$:CH$_2$NHCOCH=CH$_2$; $R^{16}$: CH$_2$NHCO(CH$_2$)$_7$CH=CH(CH$_2$)$_7$CH$_3$
(MP-150) $R^{13}$:CH$_2$NHCO(CH$_2$)$_7$CH=CH(CH$_2$)$_7$CH$_3$; $R^{14}$:CH$_2$OCH$_3$; $R^{15}$:CH$_2$OH; $R^{16}$:CH$_2$NHCOCH=CH$_2$

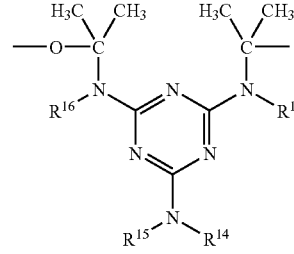

(MP-151)–(MP-200)

(MP-151) $R^{13},R^{14},R^{15},R^{16}$:CH$_2$OH
(MP-152) $R^{13},R^{14},R^{15},R^{16}$:CH$_2$OCH$_3$
(MP-153) $R^{13},R^{14},R^{15},R^{16}$:CH$_2$O-i-C$_4$H$_9$
(MP-154) $R^{13},R^{14},R^{15},R^{16}$:CH$_2$O-n-C$_4$H$_9$
(MP-155) $R^{13},R^{14},R^{15},R^{16}$:CH$_2$NHCOCH=CH$_2$
(MP-156) $R^{13},R^{14},R^{15},R^{16}$:CH$_2$NHCO(CH$_2$)$_7$CH=CH(CH$_2$)$_7$CH$_3$
(MP-157) $R^{13},R^{14},R^{15}$:CH$_2$OH; $R^{16}$:CH$_2$OCH$_3$
(MP-158) $R^{13},R^{14},R^{16}$:CH$_2$OH; $R^{15}$:CH$_2$OCH$_3$
(MP-159) $R^{13},R^{14}$:CH$_2$OH; $R^{15},R^{16}$:CH$_2$OCH$_3$
(MP-160) $R^{13},R^{16}$:CH$_2$OH; $R^{14},R^{15}$:CH$_2$OCH$_3$
(MP-161) $R^{13}$:CH$_2$OH; $R^{14},R^{15},R^{16}$:CH$_2$OCH$_3$
(MP-162) $R^{13},R^{14},R^{16}$:CH$_2$OCH$_3$; $R^{15}$:CH$_2$OH
(MP-163) $R^{13},R^{16}$:CH$_2$OCH$_3$; $R^{14},R^{15}$:CH$_2$OH
(MP-164) $R^{13},R^{14},R^{15}$:CH$_2$OH; $R^{16}$:CH$_2$O-i-C$_4$H$_9$
(MP-165) $R^{13},R^{14},R^{16}$:CH$_2$OH; $R^{15}$:CH$_2$O-i-C$_4$H$_9$
(MP-166) $R^{13},R^{14}$:CH$_2$OH; $R^{15},R^{16}$:CH$_2$O-i-C$_4$H$_9$
(MP-167) $R^{13},R^{16}$:CH$_2$OH; $R^{14},R^{15}$:CH$_2$O-i-C$_4$H$_9$
(MP-168) $R^{13}$:CH$_2$OH; $R^{14},R^{15},R^{16}$:CH$_2$O-i-C$_4$H$_9$
(MP-169) $R^{13},R^{14},R^{16}$:CH$_2$O-i-C$_4$H$_9$; $R^{15}$:CH$_2$OH
(MP-170) $R^{13},R^{16}$:CH$_2$O-i-C$_4$H$_9$; $R^{14},R^{15}$:CH$_2$OH
(MP-171) $R^{13},R^{14},R^{15}$:CH$_2$OH; $R^{16}$:CH$_2$O-n-C$_4$H$_9$
(MP-172) $R^{13},R^{14},R^{16}$:CH$_2$OH; $R^{15}$:CH$_2$O-n-C$_4$H$_9$
(MP-173) $R^{13},R^{14}$:CH$_2$OH; $R^{15},R^{16}$:CH$_2$O-n-C$_4$H$_9$
(MP-174) $R^{13},R^{16}$:CH$_2$OH; $R^{14},R^{15}$:CH$_2$O-n-C$_4$H$_9$
(MP-175) $R^{13}$:CH$_2$OH; $R^{14},R^{15},R^{16}$:CH$_2$O-n-C$_4$H$_9$
(MP-176) $R^{13},R^{14},R^{16}$:CH$_2$O-n-C$_4$H$_9$; $R^{15}$:CH$_2$OH
(MP-177) $R^{13},R^{16}$:CH$_2$O-n-C$_4$H$_9$; $R^{14},R^{15}$:CH$_2$OH
(MP-178) $R^{13},R^{14}$:CH$_2$OH; $R^{15}$:CH$_2$OCH$_3$; $R^{16}$:CH$_2$O-n-C$_4$H$_9$
(MP-179) $R^{13},R^{14}$:CH$_2$OH; $R^{15}$:CH$_2$O-n-C$_4$H$_9$; $R^{16}$:CH$_2$OCH$_3$
(MP-180) $R^{13},R^{16}$:CH$_2$OH; $R^{14}$:CH$_2$OCH$_3$; $R^{15}$:CH$_2$O-n-C$_4$H$_9$
(MP-181) $R^{13}$:CH$_2$OH; $R^{14},R^{15}$:CH$_2$OCH$_3$; $R^{16}$:CH$_2$O-n-C$_4$H$_9$
(MP-182) $R^{13}$:CH$_2$OH; $R^{14},R^{16}$:CH$_2$OCH$_3$; $R^{15}$:CH$_2$O-n-C$_4$H$_9$
(MP-183) $R^{13}$:CH$_2$OH; $R^{14}$:CH$_2$OCH$_3$; $R^{15},R^{16}$:CH$_2$O-n-C$_4$H$_9$
(MP-184) $R^{13}$:CH$_2$OH; $R^{14},R^{15}$:CH$_2$O-n-C$_4$H$_9$; $R^{16}$:CH$_2$OCH$_3$
(MP-185) $R^{13},R^{14}$:CH$_2$OCH$_3$; $R^{15}$:CH$_2$OH; $R^{16}$:CH$_2$O-n-C$_4$H$_9$
(MP-186) $R^{13},R^{16}$:CH$_2$OCH$_3$; $R^{14}$:CH$_2$OH; $R^{15}$:CH$_2$O-n-C$_4$H$_9$
(MP-187) $R^{13}$:CH$_2$OCH$_3$; $R^{14}$ $R^{15}$:CH$_2$OH; $R^{16}$:CH$_2$O-n-C$_4$H$_9$ (MP-188) $R^{13}, R^{16}$:$CH_2O$-n-$C_4H_9$; $R^{14}$:$CH_2OCH_3$; $R^{15}$:$CH_2OH$ (MP-189) $R^{13}$:$CH_2OH$; $R^{14}$:$CH_2OCH_3$; $R^{15}$:$CH_2O$-n-$C_4H_9$; $R^{16}$:$CH_2NHCOCH=CH_2$ (MP-190) $R^{13}$:$CH_2OH$; $R^{14}$:$CH_2OCH_3$; $R^{15}$:$CH_2NHCOCH=CH_2$; $R^{16}$:$CH_2O$-n-$C_4H_9$ (MP-191) $R^{13}$:$CH_2OH$; $R^{14}$:$CH_2O$-n-$C_4H_9$; $R^{15}$:$CH_2NHCOCH=CH_2$; $R^{16}$:$CH_2OCH_3$ (MP-192) $R^{13}$:$CH_2OCH_3$; $R^{14}$:$CH_2OH$; $R^{15}$:$CH_2O$-n-$C_4H_9$; $R^{16}$:$CH_2NHCOCH=CH_2$ (MP-193) $R^{13}$:$CH_2OCH_3$; $R^{14}$:$CH_2OH$; $R^{15}$:$CH_2NHCOCH=CH_2$; $R^{16}$:$CH_2O$-n-$C_4H_9$ (MP-194) $R^{13}$:$CH_2O$-n-$C_4H_9$; $R^{14}$:$CH_2OCH_3$; $R^{15}$:$CH_2OH$; $R^{16}$:$CH_2NHCOCH=CH_2$ (MP-195) $R^{13}$:$CH_2OH$; $R^{14}$:$CH_2OCH_3$; $R^{15}$:$CH_2NHCO(CH_2)_7CH=CH(CH_2)_7CH_3$; $R_{16}$:$CH_2NHCOCH=CH_2$ (MP-196) $R^{13}$:$CH_2OH$; $R^{14}$:$CH_2OCH_3$; $R^{15}$:$CH_2NHCOCH=CH_2$; $R^{16}$:$CH_2NHCO(CH_2)_7CH=CH(CH_2)_7CH_3$ (MP-197) $R^{13}$:$CH_2OH$; $R^{14}$:$CH_2NHCO(CH_2)_7CH=CH(CH_2)_7CH_3$; $R^{15}$:$CH_2NHCOCH=CH_2$; $R_{16}$:$CH_2OCH_3$ (MP-198) $R^{13}$:$CH_2OCH_3$; $R^{14}$:$CH_2OH$; $R^{15}$: $CH_2NHCO(CH_2)_7CH=CH(CH_2)_7CH_3$; $R^{16}$: $CH_2NHCOCH=CH_2$ (MP-199) $R^{13}$:$CH_2OCH_3$; $R^{14}$:$CH_2OH$; $R^{15}$:$CH_2NHCOCH=CH_2$; $R^{16}$:$CH_2NHCO(CH_2)_7CH=CH(CH_2)_7CH_3$ (MP-200) $R^{13}$:$CH_2NHCO(CH_2)_7CH=CH(CH_2)_7CH_3$; $R^{14}$:$CH_2OCH_3$; $R^{15}$:$CH_2OH$; $R^{16}$:$CH_2NHCOCH=CH_2$

A co-polymer comprising two or more kinds of repeating units is also usable, and two or more homo- or co-polymers can be used in combination.

Further, two or more retardation increasing agents may be used in combination.

(Infrared Absorber)

An infrared absorber can be added to the polymer film, to adjust the retardation value at each wavelength.

The amount of the infrared absorber is preferably in the range of 0.01 to 5 weight parts, more preferably in the range of 0.02 to 2 weight parts, further preferably in the range of 0.05 to 1 weight parts, and most preferably in the range of 0.1 to 0.5 weight parts, based on 100 weight parts of cellulose ester. Two or more infrared absorbers may be used in combination.

The infrared absorber shows the maximum absorption preferably in the wavelength region of 750 to 1,100 nm, more preferably in the wavelength region of 800 to 1,000 nm. It is also preferred for the infrared absorber to have essentially no absorption in the visible wavelength region.

As the infrared absorber, an infrared absorbing dye or pigment is preferred. An infrared absorbing dye is particularly preferred.

The infrared absorbing dyes include organic compounds and inorganic ones. Organic infrared absorbing dyes are preferred. Examples of the organic infrared absorbing dyes include cyanine compounds, metal chelate compounds, aminium compounds, diimmonium compounds, quinone compounds, squarilium compounds and methine compounds. The infrared absorbing dyes are described in Shikizai (color material, written in Japanese), 61(4), pp. 215–226 (1988) and Kagaku to Kogyo (chemistry and industry, written in Japanese), 43–53 (1986, May).

In view of infrared absorbance and absorption spectrum, infrared absorbing dyes developed in the field of silver halide photographic photosensitive material are preferred. Examples of the infrared absorbing dyes developed in the field of silver halide photographic photosensitive material include dihydroperimidine squarilium dye (described in U.S. Pat. No. 5,380,635 and Japanese Patent Application No. 62(1987)-189817), cyanine dye (described in Japanese Patent Provisional Publication Nos. 62(1987)-123454, 3(1991)-138640, 3(1991)-211542, 3(1991)-226736, 5(1993)-313305 and 6(1994)-43583, Japanese Patent Application No. 7(1995)-269097 and European Patent No. 0,430,244), pyrylium dye (described in Japanese Patent Provisional Publication Nos. 3(1991)-138640 and 3(1991)-211542), diimmonium dye (described in Japanese Patent Provisional Publication Nos. 3(1991)-138640 and 3(1991)-211542), pyrazolopyridone dye (described in Japanese Patent Provisional Publication No. 2(1990)-282244), indoaniline dye (described in Japanese Patent Provisional Publication Nos. 5(1993)-323500 and 5(1993)-323501), polymethine dye (described in Japanese Patent Provisional Publication Nos. 3(1991)-26765 and 4(1992)-190343, and European Patent No. 0,377,961), oxonol dye (described in Japanese Patent Provisional Publication No. 3(1991)-9346), anthraquinone dye (described in Japanese Patent Provisional Publication No. 4(1992)-13654), naphthalocyanine dye (described in U.S. Pat. No. 5,009,989), and naphtholactum dye (described in European Patent No. 0,568,267).

(Production of Cellulose Ester Film)

The cellulose ester film is preferably prepared according to a solvent casting method. The solvent casting method comprises the steps of dissolving cellulose ester in an organic solvent to prepare a solution (dope) and casting the dope to prepare a film.

The organic solvent is preferably selected from the group comprising an ether having 3 to 12 carbon atoms, a ketone having 3 to 12 carbon atoms, an ester having 3 to 12 carbon atoms and a halogenated hydrocarbon having 1 to 6 carbon atoms.

The ether, ketone and ester may have a cyclic structure. A compound having two or more functional groups of the ether (—O—), ketone (—CO—) and ester (—COO—) can be also used as the organic solvent. The organic solvent can have another functional group such as alcoholic hydroxyl. In the case that the organic solvent has two or more kinds of the above functional groups, the number of the carbon atoms is defined as a compound having one optionally selected from these groups.

Examples of the ethers having 3 to 12 carbon atoms include diisopropyl ether, dimethoxymethane, 1,4-dioxane, 1,3-dioxolane, tetrahydrofuran, anisole and phenetol.

Examples of the ketones having 3 to 12 carbon atom include acetone, methyl ethyl ketone, diethyl ketone, di-isobutyl ketone, cyclohexanone and methylcyclohexanone.

Examples of the esters having 3 to 12 carbon atoms include ethyl formate, propyl formate, pentyl formate, methyl acetate, ethyl acetate and pentyl acetate.

Examples of the compounds having two or more kinds of functional groups include 2-ethoxyethyl acetate, 2-methoxyethanol and 2-butoxyethanol.

The halogenated hydrocarbon preferably has one or two carbon atoms, more preferably one carbon atom. The halogen atom of the halogenated hydrocarbon is preferably chlorine. The ratio of the substitution of hydrogen with halogen is preferably in the range of 25 to 75 mole %, more preferably in the range of 30 to 70 mole %, further preferably in the range of 35 to 65 mole %, and most preferably in the range of 40 to 60 mole %. Methylene chloride is a representative halogenated hydrocarbon.

Two or more organic solvents can be used in combination.

A cellulose ester solution can be prepared according to a conventional method. The conventional method means that the solution is prepared at a temperature of not lower than 0° C. (ordinary or elevated temperature). The preparation of the solution can be conducted by using a process and apparatus for preparation of a dope in a conventional solvent casting method. The conventional method preferably uses a halogenated hydrocarbon (particularly methylene chloride) as an organic solvent.

The amount of cellulose ester is so adjusted that a prepared solution contains cellulose ester in an amount of 10 to 40 wt. %. The amount of cellulose ester is more preferably 10 to 30 wt. %. An optional additive (described below) can be added to an organic solvent.

The solution can be prepared by stirring cellulose ester and an organic solvent at an ordinary temperature (0 to 40° C.). A solution of a high concentration is preferably prepared by stirring them at an elevated temperature and at a high pressure. In that case, cellulose ester and the organic solvent are placed in a closed vessel, and are stirred at an elevated temperature and at a high pressure. The temperature is set to be higher than the boiling point at atmospheric pressure but lower than the boiling point of the solvent at the high pressure. Concretely, the heating temperature is usually not lower than 40° C., preferably in the range of 60 to 200° C., and more preferably in the range of 80 to 110° C.

The components can be preliminary dispersed coarsely, and the coarse dispersion can be placed in the vessel. Otherwise, the components can also be introduced into the vessel in series. The vessel should be equipped with a stirring device. A pressure in the vessel can be formed by introducing an inert gas such as nitrogen gas into the vessel, or by heating and evaporating the solvent to increase the vapor pressure. Further, the components can be added to the vessel at a high pressure after the vessel is sealed.

The vessel is preferably heated from the outside. For example, the vessel can be heated by a jacket type heating apparatus. Further, a plate heater can be placed on the bottom of the vessel. Furthermore, a heated liquid can be circulated in a tube around the vessel.

The components are stirred preferably by a stirring wing placed in the vessel. The stirring wing has such a length that the end of the wing reaches near the wall of the vessel. A scratching wing is preferably attached to the end of the stirring wing to scratch the solution remaining on the inside wall of the vessel.

The vessel can have a meter such as a manometer or a thermometer. The components are dissolved in the solvent in the vessel. The prepared dope is cooled in the vessel, or the dope is cooled after it is taken out of the vessel. The dope can be cooled by a heat exchanger.

The solution can be also prepared according to a cooling dissolution method. According to the cooling dissolution method, cellulose ester can be dissolved even in organic solvents (other than a halogenated hydrocarbon) in which cellulose ester cannot be dissolved according to a conventional method. Further, if organic solvents (such as a halogenated hydrocarbon) in which cellulose ester can be dissolved even by a conventional method are used, the cooling dissolution method can prepare a solution more quickly.

At the first stage of the cooling dissolution method, cellulose ester is gradually added to an organic solvent while stirring at room temperature.

The amount of cellulose ester is in the range of 10 to 40 wt. % based on the amount of the mixture, and is preferably in the range of 10 to 30 wt. %. An optional additive (described below) may be added to the solvent.

At the next stage, the mixture is cooled to a temperature of −100 to −10° C., preferably −80 to −10° C., more preferably −50 to −20° C., and most preferably −50 to −30° C. The mixture can be cooled in a dry ice/methanol bath (−7.5° C.) or in a cooled diethylene glycol solution (−30 to −20° C.). At the cooling stage, the mixture of cellulose ester and the solvent generally solidify.

The cooling rate is preferably faster than 4° C. per minute, more preferably faster than 8° C. per minute, and most preferably faster than 12° C. per minute. The cooling rate is preferably as fast as possible. However, a theoretical upper limit of the cooling rate is 10,000° C. per second, a technical upper limit is 1,000° C. per second, and a practical upper limit is 100° C. per second. The cooling rate means the change of temperature at the cooling stage per the time taken to complete the cooling stage. The change of temperature means the difference between the temperature at which the cooling stage is started and the temperature at which the cooling stage is completed.

The solidified mixture is warmed to a temperature of 0 to 200° C., preferably 0 to 150° C., more preferably 0 to 120° C., and most preferably 0 to 50° C. to dissolve the cellulose ester in the solvent. The mixture can be warmed by leaving it at room temperature or on a hot bath.

The warming rate is preferably faster than 4° C. per minute, more preferably faster than 8° C. per minute, and most preferably faster than 12° C. per minute. The warming rate is preferably fast as possible. However, a theoretical upper limit of the warming rate is 10,000° C. per second, a technical upper limit is 1,000° C. per second, and a practical upper limit is 100° C. per second. The warming rate means the change of temperature at the warming stage per the time taken to complete the warming stage. The change of temperature means the difference between the temperature at which the warming stage is started and the temperature at which the warming stage is completed.

Thus a dope is formed as a uniform solution. If cellulose ester is not sufficiently dissolved, the cooling and warming steps can be repeated. The dope is observed with eyes to determine whether cellulose ester is sufficiently dissolved or not.

A sealed vessel is preferably used in the cooling dissolution method to prevent contamination of water, which is caused by dew condensation at the cooling step. The time for the cooling and warming stages can be shortened by conducting the cooling step at a high pressure and conducting the warming step at a low pressure. A pressure vessel is preferably used at a high or low pressure.

In the case that cellulose acetate (acetic acid content: 60.9%, viscosity average degree of polymerization: 299) is dissolved in methyl acetate by a cooling dissolution method to form 20 wt. % solution, the solution has a pseudo sol-gel phase transition point at about 33° C., which is measured by a viscoelastic rheology analysis (for example, with Oscillation procedure of TA Instruments CSL2 Rheometer). Under the transition point, the solution forms a uniform gel. Therefore, the solution should be stored at a temperature higher than the transition point, preferably at a temperature about 10° C. higher than the point. The pseudo sol-gel phase. transition point depends on the combined average acetic acid content of cellulose acetate, the viscosity average degree of polymerization, the concentration of the dope and the nature of the solvent.

The obtained cellulose ester solution (dope) is cast on a support, and the solvent is evaporated to form a cellulose ester film. A drum or a band is used as the support.

Before casting the dope, the concentration of the dope is so adjusted that the solid content of the dope is in the range of 18 to 35 wt. %. The surface of the drum or band is preferably polished to give a mirror plane. The casting and drying stages of the solvent cast methods are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

The drum or band preferably has a surface temperature of not higher than 10° C. when the dope is cast. After casting the dope, the dope is preferably dried with flowing air for at least 2 seconds. The formed film is peeled off the drum or band, and can be further dried with hot air to remove the solvent remaining in the film. The temperature of the air can be gradually elevated from 100 to 160° C. The above-mentioned method is described in Japanese Patent Publication No. 5(1993)-17844. According to the method, the time for casting and peeling steps can be shortened. The method requires that the dope be set to gel at the surface temperature of the drum or band. The dope formed according to the present invention satisfies the requirement.

The cellulose ester film has a thickness preferably in the range of 40 to 120 μm, more preferably in the range of 70 to 100 μm.

A plasticizer can be added to the cellulose ester film to improve the mechanical strength of the film. The plasticizer has another function of shortening the time for the drying process. Phosphoric esters and carboxylic esters (such as phthalic esters and citric esters) are usually used as the plasticizer. Examples of the phosphoric esters include triphenyl phosphate (TPP) and tricresyl phosphate (TCP). Examples of the phthalic esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric esters include triethyl o-acetylcitrate (OACTE) and tributyl o-acetylcitrate (OACTB). Examples of the carboxylic esters include phthalic esters and citric esters. Examples of the other carboxylic esters include butyl oleate, methylacetyl ricinoleate, dibutyl sebacate and various trimellitic esters. Phthalic ester plasticizers (DMP, DEP, DBP, DOP, DPP, DEHP) are preferred. DEP and DPP are particularly preferred.

The amount of the plasticizer is preferably in the range of 0.1 to 25 wt. %, more preferably in the range of 1 to 20 wt. %, and most preferably in the range of 3 to 15 wt. % based on the amount of cellulose ester.

Deterioration inhibitors (e.g., antioxidizing agent, peroxide decomposer, radical inhibitor, metal inactivating agent, oxygen scavenger, amine) or ultraviolet inhibitors can be incorporated into the cellulose ester film. The deterioration inhibitors are described in Japanese Patent Provisional Publication Nos. 3(1991)-199201, 5(1993)-1907073, 5(1993)-194789, 5(1993)-271471 and 6(1994)-107854. The deterioration inhibitor is preferably added in the range of 0.01 to 1 wt. %, and more preferably in the range of 0.01 to 0.2 wt. % based on the amount of the prepared solution (dope). If the amount is less than 0.01 wt. %, the effect of the deterioration inhibitor cannot be expected. If the amount is more than 1 wt. %, the inhibitor often bleeds out on the surface of the film. Butyrated hydroxy-toluene (BHT) and tribenzylamine (TBA) are particularly preferred deterioration inhibitors.

The cellulose ester film is preferably stretched to adjust the refractive indexes (nx: refractive index along the slow axis in plane, ny: refractive index perpendicular to the slow axis in plane, and nz: refractive index along the thickness direction).

If the film has positive characteristic birefringence, a large refractive index is given along the aligning direction of the polymer chain. If such film is stretched, the refractive indexes generally satisfy the condition:

$$nx > ny \geqq nz.$$

This is because the polymer aligned in plane is stretched so that x component increases while z component decreases.

In the above manner, the condition of $1 \leqq (nx-nz)/(nx-ny)$ can be realized. Further, for realizing the condition of $(nx-nz)/(nx-ny) \leqq 2$, monoaxial stretching is controlled or unbalance biaxial stretching is carried out to adjust the refractive indexes.

The monoaxial stretching or the unbalance biaxial stretching is carried out so that the maximum stretching extent SA and the stretching extent perpendicular to that direction SB may satisfy the condition of $1 < SA/SB \leqq 3$. Here, 'stretching extent' means the ratio of the length after stretching to the initial length. The stretching extent SB may be less than 1 (this means that the film may shrink laterally). As long as the above condition is satisfied, the SB may be less than 1.

The stretching extents are adjusted so that the front retardation may be λ/4 or λ/2.

The stretching may be simultaneously or successively carried out.

(Circularly Polarizing Plate)

A λ/4 plate and a linearly polarizing membrane are laminated so that the slow axis in plane of the λ/4 plate may be essentially at an angle of 45° to the polarizing axis of the linearly polarizing membrane. Here, 'essentially at an angle of 45°' means the angle between the axes is in the range of 40 to 50°. The angle is preferably in the range of 41 to 49°, more preferably in the range of 42 to 48°, further preferably in the range of 43 to 47°, and most preferably in the range of 44 to 46°.

Examples of the linearly polarizing membrane include an iodine polarizing membrane, a dye polarizing membrane such as a dichromatic dye polarizing membrane and a polyene polarizing membrane. The iodine polarizing membrane and the dye polarizing membrane are usually made of polyvinyl alcohol films. The polarizing axis of the linearly polarizing membrane is perpendicular to the stretching direction of the film.

A transparent film is preferably provided on the surface (not facing to the λ/4 plate) of the linearly polarizing membrane.

(Liquid Crystal Display of Reflection Type)

FIG. 1 schematically illustrates a basic structure of a liquid crystal display of reflection type.

The display shown in FIG. 1 comprises a lower substrate (1), a reflective electrode (2), a lower orientation layer (3), a liquid crystal layer (4), an upper orientation layer (5), a transparent electrode (6), an upper substrate (7), a λ/4 plate (8) and a polarizing membrane (9) in this order.

A combination of the lower substrate (1) and the reflective electrode (2) constitutes a reflector (reflection board). A combination of the lower orientation layer (3) to the upper orientation layer (5) constitutes a liquid crystal cell. The λ/4 plate (8) may be placed at any position between the reflection board and the polarizing membrane (9).

For displaying a color image, a color filter layer is provided. The color filter may be placed between the reflective electrode (2) and the lower orientation layer (3), or between the upper orientation layer (5) and the upper substrate (7).

In place of the reflective electrode (2), a transparent electrode may be used in combination with a reflection board. The reflection board is preferably a metal board or a semi-transparent reflection board.

If the reflection board has a smooth surface, rays parallel to the normal of the surface are often predominantly reflected to give a small viewing angle. Therefore, the surface of the reflection board may be made rugged (as described in Japanese Patent No. 275,620). Otherwise, a light-diffusing film may be provided on one surface (cell side or air side) of the polarizing membrane.

The liquid crystal cell is preferably TN (twisted nematic) mode, STN (supper twisted nematic) mode, HAN (hybrid aligned nematic) mode, or ECB (electrically controlled birefringence) mode. TN mode, STN mode or HAN mode is more preferred.

The liquid crystal cell of TN mode has a twist angle preferably in the range of 40 to 100°, more preferably in the range of 50 to 90°, and most preferably in the range of 60 to 80°. The product ($\Delta$nd) of refractive anisotropy ($\Delta$n) and thickness of the liquid crystal layer (d) is preferably in the range of 0.1 to 0.5 μm, more preferably in the range of 0.2 to 0.4 μm.

The liquid crystal cell of STN mode has a twist angle preferably in the range of 180 to 360°, more preferably in the range of 220 to 270°. The product ($\Delta$nd) of refractive anisotropy ($\Delta$n) and thickness of the liquid crystal layer (d) is preferably in the range of 0.3 to 1.2 μm, more preferably in the range of 0.5 to 1.0 μm.

In the liquid crystal cell of HAN mode, it is preferred that liquid crystal molecules be essentially vertically aligned on one substrate and that the pre-tilt angle on the other substrate be in the range of 0 to 45°. The product ($\Delta$nd) of refractive anisotropy ($\Delta$n) and thickness of the liquid crystal layer (d) is preferably in the range of 0.1 to 1.0 μm, more preferably in the range of 0.3 to 0.8 μm. The substrate on which the liquid crystal molecules are vertically aligned may be on the transparent electrode side or on the opposite side.

Examples of the polarizing membrane include an iodine polarizing membrane, a dye polarizing membrane such as a dichromatic dye polarizing membrane and a polyene polarizing membrane. The iodine polarizing membrane and the dye polarizing membrane are usually made of polyvinyl alcohol films. The polarizing axis of the linearly polarizing membrane is perpendicular to the stretching direction of the film.

The liquid crystal display of reflection type may be designed normally white mode (in which a bright or dark image is displayed when the applied voltage is low or high, respectively) or normally black mode (in which a dark or bright image is displayed when the applied voltage is low or high, respectively). The normally white mode is preferred.

EXAMPLE 1

(Preparation of Phase Retarder)

At room temperature, 45 weight parts of cellulose acetate (average acetic acid content: 60.9%), 0.675 weight part of the retardation increasing agent (504), 0.225 weight part of the retardation increasing agent (595), 232.72 weight parts of methylene chloride, 42.57 weight parts of methanol, and 8.50 weight parts of n-butanol were mixed to prepare a dope.

The prepared dope was cast on a glass plate, dried at room temperature for 1 minute, and further dried at 50° C. for 5 minutes. Through drying, the solvent was evaporated by 3 wt. %. The formed cellulose acetate film was peel from the glass plate, and monoaxially stretched at 120° C. The obtained cellulose acetate film had a dry thickness of 200 μm.

The retardation value (Re) of the prepared cellulose acetate film was measured at the wavelength of 450 nm, 550 nm and 590 nm by means of an ellipsometer (M-150, Japan Spectrum Co., Ltd.), and found 112.8 nm, 137.5 nm and 145.1 nm, respectively.

COMPARISON EXAMPLE 1

(Preparation of Phase Retarder)

Polycarbonate (weight average molecular weight: 100,000) was dissolved in methylene chloride to prepare 17 wt. % solution. The solution was cast on a glass plate, dried at room temperature for 30 minutes, and further dried at 70° C. for 30 minutes. Through drying, the solvent was evaporated by 1 wt. %. The formed polycarbonate film was peel from the glass plate. Thus, a polycarbonate film having a dry thickness of 80 μm was prepared. The film was cut into pieces of 5 cm×10 cm, and then stretched by 4% at 158° C. Thus, a birefringent stretched polycarbonate film was prepared.

The retardation value (Re) of the prepared polycarbonate film (phase retarder) was measured at the wavelength of 450 nm, 550 nm and 590 nm by means of an ellipsometer (M-150, Japan Spectrum Co., Ltd.), and found 147.8 nm, 137.5 nm and 134.9 nm, respectively.

EXAMPLE 2

(Preparation of Circularly Polarizing Plate)

A transparent protective film, a polarizing membrane, and the phase retarder prepared in Example 1 were piled up to prepare a circularly polarizing plate. The slow axis of the phase retarder was placed at an angle of 45° to the polarizing axis of the polarizing membrane.

It was confirmed that the prepared circularly polarizing plate gave almost completely circularly polarized light within a wide wavelength region (450 to 590 nm).

EXAMPLE 3

(Preparation of Phase Retarder)

The procedure of Example was repeated except that the amount of the dope was changed to prepare a cellulose acetate film having a dry thickness of 400 μm.

The retardation value (Re) of the prepared cellulose acetate film was measured at the wavelength of 450 nm, 550 nm and 590 nm by means of an ellipsometer (M-150, Japan Spectrum Co., Ltd.), and found 225.6 nm, 275.1 nm and 190.2 nm, respectively.

EXAMPLE 4

(Preparation of Phase Retarder)

At room temperature, 120 weight parts of cellulose acetate (average acetic acid content: 59.0%), 9.36 weight parts of triphenylphosphate, 4.68 weight parts of biphenyldiphenylphosphate, 1.00 weight part of the following retardation increasing agent, 543.14 weight parts of methylene chloride, 99.35 weight parts of methanol, and 19.87 weight parts of n-butanol were mixed to prepare a dope.

(Retardation Increasing Agent)

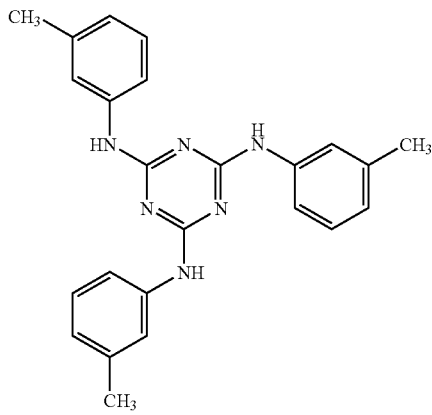

The prepared dope was cast on a glass plate, dried at room temperature for 1 minute, and further dried at 45° C. for 5 minutes. After drying, the amount of remaining solvent was 30 wt. %. The formed cellulose acetate film was peel from the glass plate, and dried at 120° C. for 10 minutes. The film was cut into pieces, and then stretched at 130° C. parallel to the casting direction. In stretching, the film was let to freely shrink vertically to the casting direction. The stretched film was dried at 120° C. for 30 minutes while the film was left on the stretching means. After drying, the film was taken out of the stretching means. The amount of remaining solvent was 0.1 wt. %.

The thickness of the film was 101 μm, and the ratio of stretching extent (SA/SB) was 1.89.

The retardation value (Re) of the prepared cellulose acetate film was measured at the wavelength of 450 nm, 550 nm and 590 nm by means of an ellipsometer (M-150, Japan Spectrum Co., Ltd.), and found 119.3 nm, 137.2 nm and 142.7 nm, respectively. This meant that the prepared cellulose acetate film gave λ/4 within a wide wavelength region.

The refractive indexes were measured with Abbe's refractometer and the angle dependence of retardation was also measured to determine nx (refractive index along the slow axis in plane), ny (refractive index perpendicular to the slow axis in plane) and nz (refractive index along the thickness direction) at 550 nm. From the obtained refractive indexes, the value of (nx−nz)/(nx−ny) was calculated to find 1.60.

EXAMPLE 5
(Preparation of Phase Retarder)

At room temperature, 120 weight parts of cellulose acetate (average acetic acid content: 59.7%), 1.20 weight part of the retardation increasing agent used in Example 4, 9.36 weight parts of triphenylphosphate, 4.68 weight parts of biphenyldiphenylphosphate, 543.14 weight parts of methylene chloride, 99.35 weight parts of methanol, and 19.87 weight parts of n-butanol were mixed to prepare a dope.

The procedure of Example 4 was repeated except that the above-prepared dope was used, to produce a phase retarder.

The thickness of the film was 97 μm, and the ratio of stretching extent (SA/SB) was 1.71.

The retardation value (Re) of the prepared cellulose acetate film was measured at the wavelength of 450 nm, 550 nm and 590 nm by means of an ellipsometer (M-150, Japan Spectrum Co., Ltd.), and found 116.7 nm, 137.4 nm and 143.1 nm, respectively. This meant that the prepared cellulose acetate film gave v/4 within a wide wavelength region.

The refractive indexes were measured with Abbe's refractometer and the angle dependence of retardation was also measured to determine nx (refractive index along the slow axis in plane), ny (refractive index perpendicular to the slow axis in plane) and nz (refractive index along the thickness direction) at 550 nm. From the obtained refractive indexes, the value of (nx−nz)/(nx−ny) was calculated to find 1.50.

EXAMPLE 6
(Preparation of Phase Retarder)

The dope prepared in Example 5 was cast on a glass plate, dried at room temperature for 1 minute, and further dried at 45° C. for 5 minutes. After drying, the amount of remaining solvent was 30 wt. %. The formed cellulose acetate film was peel from the glass plate. The film was cut into pieces, and then stretched at 130° C. parallel to the casting direction. In stretching, the film was laterally fixed to keep the initial length vertical to the casting direction (i.e., so that the stretching extent vertical to the casting direction might be kept 1.0). The stretched film was dried at 120° C. for 30 minutes while the film was left on the stretching means. After drying, the film was taken out of the stretching means. The amount of remaining solvent was 0.2 wt. %.

The thickness of the film was 95 μm, and the ratio of stretching extent (SA/SB) was 1.50.

The retardation value (Re) of the prepared cellulose acetate film was measured at the wavelength of 450 nm, 550 nm and 590 nm by means of an ellipsometer (M-150, Japan Spectrum Co., Ltd.), and found 115.0 nm, 137.2 nm and 144.3 nm, respectively. This meant that the prepared cellulose acetate film gave λ/4 within a wide wavelength region.

The refractive indexes were measured with Abbe's refractometer and the angle dependence of retardation was also measured to determine nx (refractive index along the slow axis in plane), ny (refractive index perpendicular to the slow axis in plane) and nz (refractive index along the thickness direction) at 550 nm. From the obtained refractive indexes, the value of (nx−nz)/(nx−ny) was calculated to find 1.62.

EXAMPLE 7
(Preparation of Phase Retarder)

At room temperature, 120 weight parts of cellulose acetate (average acetic acid content: 59.7%), 1.20 weight part of the retardation increasing agent used in Example 4, 9.36 weight parts of triphenylphosphate, 4.68 weight parts of biphenyldiphenylphosphate, 2.0 weight parts of tribenzyl amine, 538.2 weight parts of methylene chloride, and 46.8 weight parts of methanol were mixed to prepare a dope.

The procedure of Example 4 was repeated except that the above-prepared dope was used, to produce a phase retarder.

The thickness of the film was 108 μm, and the ratio of stretching extent (SA/SB) was 1.63.

The retardation value (Re) of the prepared cellulose acetate film was measured at the wavelength of 450 nm, 550 nm and 590 nm by means of an ellipsometer (M-150, Japan Spectrum Co., Ltd.), and found 121.2 nm, 137.5 nm and 142.7 nm, respectively. This meant that the prepared cellulose acetate film gave λ/4 within a wide wavelength region.

The refractive indexes were measured with Abbe's refractometer and the angle dependence of retardation was also measured to determine nx (refractive index along the slow axis in plane), ny (refractive index perpendicular to the slow axis in plane) and nz (refractive index along the thickness direction) at 550 nm. From the obtained refractive indexes, the value of (nx−nz)/(nx−ny) was calculated to find 1.50.

EXAMPLE 8
(Preparation of Circularly Polarizing Plate)

A transparent protective film, a polarizing membrane, and the phase retarder prepared in Example 5 were piled up to prepare a circularly polarizing plate. The slow axis of the phase retarder was placed at an angle of 45° to the polarizing axis of the polarizing membrane.

It was confirmed that the prepared circularly polarizing plate gave almost completely circularly polarized light within a wide wavelength region (450 to 590 nm).

EXAMPLE 9
(Preparation of Circularly Polarizing Plate)

A transparent protective film, a polarizing membrane, and the phase retarder prepared in Example 7 were piled up to prepare a circularly polarizing plate. The slow axis of the phase retarder was placed at an angle of 45° to the polarizing axis of the polarizing membrane.

It was confirmed that the prepared circularly polarizing plate gave almost completely circularly polarized light within a wide wavelength region (450 to 590 nm).

COMPARISON EXAMPLE 2
(Preparation of Circularly Polarizing Plate)

A transparent protective film, a polarizing membrane, and the phase retarder prepared in Comparison Example 1 were piled up to prepare a circularly polarizing plate. The slow axis of the phase retarder was placed at an angle of 45° to the polarizing axis of the polarizing membrane.
(Evaluation of Circularly Polarizing Plate)

Each circularly polarizing plate prepared in Examples 8, 9 and Comparison Example 2 was installed in a liquid crystal panel of reflection type, and the viewing angle character was measured by means of a meter (EZ-Contrast 160D, ELDIM). The results are set forth in Table 1, which tells that each circularly polarizing plate prepared in Examples 8 and 9 gave a wide viewing angle.

TABLE 1

| Circularly | Viewing angle (contrast 3) | |
|---|---|---|
| Polarizing plate | Upward-downward | Leftward-rightward |
| Example 8 | 129° | 118° |
| Example 9 | 130° | 119° |
| Comp. Example 8 | 98° | 98° |

EXAMPLE 10
(Preparation of Phase Retarder)

The procedure of Example 5 was repeated except that the amount of the dope was changed to prepare a cellulose acetate film having a dry thickness of 200 μm.

The ratio of stretching extent (SA/SB) was 2.02.

The retardation value (Re) of the prepared cellulose acetate film was measured at the wavelength of 450 nm, 550 nm and 590 nm by means of an ellipsometer (M-150, Japan Spectrum Co., Ltd.), and found 232.1 nm, 273.6 nm and 285.3 nm, respectively. This meant that the prepared cellulose acetate film gave λ/2 within a wide wavelength region.

EXAMPLE 11
(Preparation of λ/4 Plate)

At room temperature, 120 weight parts of cellulose acetate (average acetic acid content: 59.7%), 1.20 weight part of the retardation increasing agent used in Example 4, 7.80 weight parts of triphenylphosphate, 6.24 weight parts of biphenyldiphenylphosphate, 543.14 weight parts of methylene chloride, 99.35 weight parts of methanol, and 19.87 weight parts of n-butanol were mixed to prepare a dope.

The prepared dope was cast on a glass plate, dried at room temperature for 1 minute, and further dried at 45° C. for 5 minutes. After drying, the amount of remaining solvent was 30 wt. %. The formed cellulose acetate film was peel from the glass plate. The film was cut into pieces, and then stretched at 130° C. parallel to the casting direction. In stretching, the film was let to freely shrink vertically to the casting direction. The stretched film was dried at 120° C. for 30 minutes while the film was left on the stretching means. After drying, the film was taken out of the stretching means. The amount of remaining solvent was 0.1 wt. %.

The thickness of the film was 97 μm, and the ratio of stretching extent (SA/SB) was 2.07.

The retardation value (Re) of the prepared cellulose acetate film was measured at the wavelength of 450 nm, 550 nm and 590 nm by means of an ellipsometer (M-150, Japan Spectrum Co., Ltd.), and found 116.7 nm, 137.5 nm and 143.1 nm, respectively. This meant that the prepared cellulose acetate film gave λ/4 within a wide wavelength region.

The refractive indexes were measured with Abbe's refractometer and the angle dependence of retardation was also measured to determine nx (refractive index along the slow axis in plane), ny (refractive index perpendicular to the slow axis in plane) and nz (refractive index along the thickness direction) at 550 nm. From the obtained refractive indexes, the value of (nx−nz)/(nx−ny) was calculated to find 1.50.
(Preparation of Liquid Crystal Display of Reflection Type)

From a commercially available liquid crystal display of reflection type (Color Zaurus MI-310, Sharp Corporation), the polarizing plate and the phase retarder were peeled. In place of them, the above-prepared λ/4 plate and a polarizing plate (a polarizing membrane laminated with a protective film whose surface was subjected to AR treatment) were provided.

The thus-prepared liquid crystal display was observed with eyes, and thereby it was confirmed that an image of neutral gray was given without undesirable coloring in any displaying mode such as white mode, black mode or neutral tone.

The contrast ratio of reflection brightness was measured by means of a meter (EZ-Contrast 160D, ELDIM), and thereby it was found that the front contrast ratio was 20 and that the viewing angle giving the contrast ratio of 3 was not less than 120° (upward-downward) or not less than 120° (leftward-rightward).

EXAMPLE 12
(Preparation of λ/4 Plate)

At room temperature, 120 weight parts of cellulose acetate (average acetic acid content: 59.0%), 9.36 weight parts of triphenylphosphate, 4.68 weight parts of biphenyldiphenylphosphate, 1.00 weight part of the retardation increasing agent used in Example 4, 543.14 weight parts of methylene chloride, 99.35 weight parts of methanol, and 19.87 weight parts of n-butanol were mixed to prepare a dope.

The procedure of Example 1 was repeated except that the above-prepared dope was used, to prepare a phase retarder.

The thickness of the film was 101 μm, and the ratio of stretching extent (SA/SB) was 1.89.

The retardation value (Re) of the prepared cellulose acetate film was measured at the wavelength of 450 nm, 550 nm and 590 nm by means of an ellipsometer (M-150, Japan Spectrum Co., Ltd.), and found 117.3 nm, 137.5 nm and 142.7 nm, respectively. This meant that the prepared cellulose acetate film gave λ/4 within a wide wavelength region.

The refractive indexes were measured with Abbe's refractometer and the angle dependence of retardation was also measured to determine nx (refractive index along the slow axis in plane), ny (refractive index perpendicular to the slow axis in plane) and nz (refractive index along the thickness direction) at 550 nm. From the obtained refractive indexes, the value of (nx−nz)/(nx−ny) was calculated to find 1.60.

(Preparation of Liquid Crystal Display of Reflection Type)

A glass substrate having an ITO transparent electrode and another glass substrate having a finely rugged aluminum reflective electrode were prepared. On each electrode of the glass substrate, a polyimide orientation layer (SE-7992, Nissan Chemicals Co., Ltd.) was formed and subjected to rubbing treatment. The substrates were laminated so that the polyimide orientation layers might face to each other, and a spacer of 2.5 μm was inserted between the substrates. The substrates were placed so that the rubbing directions of the orientation layers might be crossed at an angle of 117°. To the space between the substrates, a liquid crystal compound (MLC-6252, Merck) was injected to form a liquid crystal layer. Thus, a liquid crystal cell of TN mode (twisted angle: 63°, Δnd: 198 nm) was produced.

The above-prepared λ/4 plate was laminated with an adhesive on the outside surface of the glass substrate having the ITO transparent electrode, and further thereon a polarizing plate (a polarizing membrane laminated with a protective film whose surface was subjected to AR treatment) was laminated.

To the thus-prepared liquid crystal display, a pulse voltage of 1 kHz was applied. The display was then observed with eyes, and thereby it was confirmed that an image of neutral gray was given without undesirable coloring in either white mode (1.5 V) or black mode (4.5 V).

The contrast ratio of reflection brightness was measured by means of a meter (EZ-Contrast 160D, ELDIM), and mthereby it was found that the front contrast ratio was 23 and that the viewing angle giving the contrast ratio of 3 was not less than 120° (upward-downward) or not less than 120° (leftward-rightward).

EXAMPLE 13

(Preparation of Liquid Crystal Display of Reflection Type)

A glass substrate having an ITO transparent electrode and another glass substrate having a finely rugged aluminum reflective electrode were prepared. On each electrode of the glass substrate, a polyimide orientation layer (SE-7992, Nissan Chemicals Co., Ltd.) was formed and subjected to rubbing treatment. The substrates were laminated so that the polyimide orientation layers might face to each other, and a spacer of 3.4 μm was inserted between the substrates. The substrates were placed so that the rubbing directions of the orientation layers might be crossed at an angle of 110°. To the space between the substrates, a liquid crystal compound (MLC-6252, Merck) was injected to form a liquid crystal layer. Thus, a liquid crystal cell of TN mode (twisted angle: 70°, Δnd: 269 nm) was produced.

The λ/4 plate prepared in Example 11 was laminated with an adhesive on the outside surface of the glass substrate having the ITO transparent electrode, and further thereon a polarizing plate (a polarizing membrane laminated with a protective film whose surface was subjected to AR treatment) was laminated.

To the thus-prepared liquid crystal display, a pulse voltage of 1 kHz was applied. The display was then observed with eyes, and thereby it was confirmed that an image of neutral gray was given without undesirable coloring in either white mode (1.5 V) or black mode (4.5 V).

The contrast ratio of reflection brightness was measured by means of a meter (EZ-Contrast 160D, ELDIM), and thereby it was found that the front contrast ratio was 25 and that the viewing angle giving the contrast ratio of 3 was not less than 120° (upward-downward) or not less than 120° (leftward-rightward).

COMPARISON EXAMPLE 3

(Preparation of λ/4 Plate)

Polycarbonate (weight average molecular weight: 100,000) was dissolved in methylene chloride to prepare 17 wt. % solution. The solution was cast on a glass plate, dried at room temperature for 30 minutes, and further dried at 70° C. for 30 minutes. Through drying, the solvent was evaporated by 1 wt. %. The formed polycarbonate film was peel from the glass plate. Thus, a polycarbonate film having a dry thickness of 80 μm was prepared. The film was cut into pieces of 5 cm×10 cm, and then monoaxially stretched at 158° C. Thus, a birefringent stretched polycarbonate film was prepared.

The retardation value (Re) of the prepared polycarbonate film (λ/4 plate) was measured at the wavelength of 450 nm, 550 nm and 590 nm by means of an ellipsometer (M-150, Japan Spectrum Co., Ltd.), and found 147.8 nm, 137.5 nm and 134.9 nm, respectively.

(Preparation of λ/2 Plate)

The above procedure was repeated except that the amount of the cast solution was changed, to prepare a λ/2 plate.

The retardation value (Re) of the prepared polycarbonate film (λ/2 plate) was measured at the wavelength of 450 nm, 550 nm and 590 nm by means of an ellipsometer (M-150, Japan Spectrum Co., Ltd.), and found 295.0 nm, 275.0 nm and 269.8 nm, respectively.

(Preparation of Liquid Crystal Display of Reflection Type)

The λ/4 plate, the λ/2 plate and a polarizing plate (a polarizing membrane laminated with a protective film whose surface was subjected to AR treatment) were laminated with an adhesive in this order on the glass substrate having an ITO transparent electrode used in the liquid crystal cell of TN mode prepared in Example 13. The angle between the transparent axis of the polarizing membrane and the slow axis of the λ/2 plate was set at 20°, and the angle between the slow axis of the λ/2 plate and that of the λ/4 plate was set at 55°.

To the thus-prepared liquid crystal display, a pulse voltage of 1 kHz was applied. The display was then observed with eyes, and thereby it was confirmed that an image was slightly yellowed in white mode (1.5 V) and was slightly blued in black mode (4.5 V).

The contrast ratio of reflection brightness was measured by means of a meter (EZ-Contrast 160D, ELDIM), and thereby it was found that the front contrast ratio was 10 and that the viewing angle giving the contrast ratio of 3 was 100° (upward-downward) or 80° (leftward-rightward).

EXAMPLE 14

(Preparation of Liquid Crystal Display of Reflection Type)

A glass substrate having an ITO transparent electrode and another glass substrate having a smooth aluminum reflective electrode were prepared. On each electrode of the glass substrate, a polyimide orientation layer (SE-150, Nissan Chemicals Co., Ltd.) was formed and subjected to rubbing treatment. The substrates were laminated so that the polyimide orientation layers might face to each other, and a spacer of 6.0 μm was inserted between the substrates. The substrates were placed so that the rubbing directions of the orientation layers might be crossed at an angle of 60°. To the space between the substrates, a liquid crystal compound (ZLI-2977, Merck) was injected to form a liquid crystal layer. Thus, a liquid crystal cell of STN mode (twisted angle: 240°, Δnd: 791 nm) was produced.

An inner diffusing sheet (IDS, Dai Nippon Printing Co., Ltd.) and the λ/4 plate prepared in Example 1 were laminated in this order with an adhesive on the outside surface of the glass substrate having the ITO transparent electrode, and further thereon a polarizing plate (NPF-G1225DU, Nitto Denko Co., Ltd.) was laminated.

To the thus-prepared liquid crystal display, a pulse voltage of 55 Hz was applied. The display was then observed with eyes, and thereby it was confirmed that an image of neutral gray was given without undesirable coloring in either white mode (2.5 V) or black mode (2.0 V).

The contrast ratio of reflection brightness was measured by means of a meter (EZ-Contrast 160D, ELDIM), and thereby it was found that the front contrast ratio was 8 and that the viewing angle giving the contrast ratio of 3 was 90° (upward-downward) or 105° (leftward-rightward).

EXAMPLE 15
(Preparation of Liquid Crystal Display of Reflection Type)

A glass substrate having an ITO transparent electrode and another glass substrate having a smooth aluminum reflective electrode were prepared. On the ITO electrode of the glass substrate, a polyimide orientation layer (SE-610, Nissan Chemicals Co., Ltd.) was formed and subjected to rubbing treatment. On the aluminum reflective electrode, a vertical orientation layer (SE-1211, Nissan Chemicals Co., Ltd.) was formed. The vertical orientation layer was not subjected to rubbing treatment. The substrates were laminated so that the polyimide orientation layers might face to each other, and a spacer of 4.0 μm was inserted between the substrates. To the space between the substrates, a liquid crystal compound (ZLI-1565, Merck) was injected to form a liquid crystal layer. Thus, a liquid crystal cell of HAN mode (Δnd: 519 nm) was produced.

The λ/4 plate prepared in Example 1 was laminated with an adhesive on the outside surface of the glass substrate having the ITO transparent electrode, and further thereon a polarizing plate (NPF-G1225DU, Nitto Denko Co., Ltd.) was laminated. Furthermore, a light-diffusing film (Lumisty, Sumitomo Chemical Co., Ltd.) was laminated thereon.

To the thus-prepared liquid crystal display, a pulse voltage of 55 Hz was applied. The display was then observed with eyes, and thereby it was confirmed that an image of neutral gray was given without undesirable coloring in either white mode (2.0 V) or black mode (0.8 V).

The contrast ratio of reflection brightness was measured by means of a meter (EZ-Contrast 160D, ELDIM), and thereby it was found that the front contrast ratio was 8 and that the viewing angle giving the contrast ratio of 3 was not less than 120° (upward-downward) or not less than 120° (leftward-rightward).

EXAMPLE 16
(Preparation of Phase Retarder)

At room temperature, 120 weight parts of cellulose acetate (average acetic acid content: 59.7%), 9.36 weight parts of triphenylphosphate, 4.68 weight parts of biphenyldiphenylphosphate, 1.20 weight part of the retardation increasing agent used in Example 4, 2.4 weight parts of tribenzylamine, 718 weight parts of methylene chloride, and 62.4 weight parts of methanol were mixed to prepare a dope.

The prepared dope was cast on a glass plate, dried at room temperature for 1 minute, and further dried at 45° C. for 5 minutes. The formed cellulose acetate film was peel from the glass plate, dried at 100° C. for 30 minutes, and further dried at 130° C. for 20 minutes. The amount of remaining solvent after drying was 0.5 wt. %.

The film was cut into pieces, and then stretched to the extent of 1.33 in length at 130° C. parallel to the casting direction. In stretching, the film was let to freely shrink vertically to the casting direction. The stretched film was cooled to room temperature while the film was left on the stretching means. After drying, the film was taken out of the stretching means. The amount of remaining solvent was 0.1 wt. %.

The thickness of the film was 102 μm, and the ratio of stretching extent (SA/SB) was 1.48.

The retardation value (Re) of the prepared cellulose acetate film was measured at the wavelength of 450 nm, 550 nm and 590 nm by means of an ellipsometer (M-150, Japan Spectrum Co., Ltd.), and found 109.4 nm, 125.3 nm and 130.2 nm, respectively. This meant that the prepared cellulose acetate film gave λ/4 within a wide wavelength region.

The refractive indexes were measured with Abbe's refractometer and the angle dependence of retardation was also measured to determine nx (refractive index along the slow axis in plane), ny (refractive index perpendicular to the slow axis in plane) and nz (refractive index along the thickness direction) at 550 nm. From the obtained refractive indexes, the value of (nx−nz)/(nx−ny) was calculated to find 1.90.

EXAMPLE 17
(Preparation of Phase Retarder)

The dope prepared in Example 16 was cast on a glass plate, dried at room temperature for 1 minute, and further dried at 45° C. for 5 minutes. The formed cellulose acetate film was peel from the glass plate, and dried at 110° C. for 20 minutes. The amount of remaining solvent after drying was 3 wt. %.

The film was cut into pieces, and then stretched to the extent of 1.45 in length at 125° C. parallel to the casting direction. In stretching, the film was let to freely shrink vertically to the casting direction. The stretched film was dried at 120° C. for 20 minutes while the film was left on the stretching means. After drying, the film was taken out of the stretching means. The amount of remaining solvent was 0.1 wt. %.

The thickness of the film was 101 μm, and the ratio of stretching extent (SA/SB) was 1.81.

The retardation value (Re) of the prepared cellulose acetate film was measured at the wavelength of 450 nm, 550 nm and 590 nm by means of an ellipsometer (M-150, Japan Spectrum Co., Ltd.), and found 114.1 nm, 130.0 nm and 137.0 nm, respectively. This meant that the prepared cellulose acetate film gave λ/4 within a wide wavelength region.

The refractive indexes were measured with Abbe's refractometer and the angle dependence of retardation was also measured to determine nx (refractive index along the slow axis in plane), ny (refractive index perpendicular to the slow axis in plane) and nz (refractive index along the thickness direction) at 550 nm. From the obtained refractive indexes, the value of (nx−nz)/(nx−ny) was calculated to find 1.53.

What is claimed is:

1. A phase retarder comprising one cellulose ester film, wherein a retardation value of the film represented by Re450 measured at the wavelength of 450 nm is in the range of 100 to 125 nm, a retardation value of the film represented by Re590 measured at the wavelength of 590 nm is in the range of 120 to 160 nm, and the retardation values represented by Re450 and Re590 satisfy the condition of Re590−Re450≧10 nm, and wherein the film contains an aromatic compound having at least two aromatic rings as a retardation increasing agent.

2. The phase retarder as defined in claim 1, wherein a retardation value of the film represented by Re450 measured at the wavelength of 450 nm is in the range of 108 to 120 nm, a retardation value of the film represented by Re550 measured at the wavelength of 550 nm is in the range of 125 to 142 nm, a retardation value of the film represented by Re590 measured at the wavelength of 590 nm is in the range of 130 to 152 nm, and the retardation values represented by Re550 and Re590 satisfy the condition of Re590−Re550≧5 nm.

3. The phase-retarder as defined in claim 1, wherein the cellulose ester film is made of cellulose acetate having an acetic acid content in the range of 45.0 to 62.5%.

4. The phase-retarder as defined in claim 1, wherein at least two aromatic rings is a 1,3,5-triazine ring.

5. The phase retarder as defined in claim 1, wherein the cellulose ester film contains the aromatic compound having at least two aromatic rings in an amount of 0.05 to 20 weight parts based on 100 weight parts of the cellulose ester.

6. The phase retarder as defined in claim 1, wherein a refractive index of the cellulose ester film represented by nx measured along a slow axis of the film in plane, a refractive index of the film represented by ny measured along a direction perpendicular to the slow axis in plane and the refractive index of the film represented by nz along a thickness direction of the film satisfy the formula of $1 \leq (nx-nz)/(nx-ny) \leq 2$.

7. The phase retarder as defined in claim 6, wherein the cellulose ester film is a stretched film.

8. The phase retarder as defined in claim 7, wherein the cellulose ester film is so stretched that the maximum stretch ratio represented by SA and a stretch ratio represented by SB measured along a direction perpendicular to the direction of SA satisfy the condition of $1 < SA/SB \leq 3$.

9. A circularly polarizing plate comprising a phase retarder and a linearly polarizing membrane, said phase retarder and said linearly polarizing membrane being positioned such that a slow axis in plane of the phase retarder is at an angle of 45° to a polarizing axis of the linearly polarizing membrane, and said phase retarder comprising one cellulose ester film, wherein a retardation value of the film represented by Re450 measured at the wavelength of 450 nm is in the range of 100 to 125 nm, a retardation value of the film represented by Re590 measured at the wavelength of 590 nm is in the range of 120 to 160 nm, and the retardation values represented by Re450 and Re590 satisfy the condition of Re590−Re450≧10 nm, and wherein the film contains an aromatic compound having at least two aromatic rings as a retardation increasing agent.

10. A liquid crystal display of reflection type comprising a reflector, a liquid crystal cell and a polarizing plate in this order, wherein the polarizing plate comprises a polarizing membrane; wherein a λ/4 plate is further provided between the reflector and the polarizing membrane, said λ/4 plate comprising one cellulose ester film, wherein a retardation value of the film represented by Re450 measured at the wavelength of 450 nm is in the range of 100 to 125 nm, a retardation value of the film represented by Re590 measured at the wavelength of 590 nm is in the range of 120 to 160 nm, and retardation values represented by Re450 and Re590 satisfy the condition of Re590−Re450≧10 nm, and wherein the film contains an aromatic compound having at least two aromatic rings as a retardation increasing agent.

11. A phase retarder comprising one cellulose ester film, wherein a retardation value of the film represented by Re450 measured at the wavelength of 450 nm is in the range of 200 to 250 nm, a retardation value of the film represented by Re590 measured at the wavelength of 590 nm is in the range of 240 to 320 nm, and the retardation values represented by Re450 and Re590 satisfy the condition of Re590−Re450≧20 nm, and wherein the film contains an aromatic compound having at least two aromatic rings as a retardation increasing agent.

12. The phase retarder as defined in claim 11, wherein a retardation value of the film represented by Re450, measured at the wavelength of 450 nm is in the range of 216 to 240 nm, a retardation value of the film represented by Re550 measured at the wavelength of 550 nm is in the range of 250 to 284 nm, a retardation value of the film represented by Re590 measured at the wavelength of 590 nm is in the range of 260 to 304 nm, and the retardation values represented by Re550 and Re590 satisfy the condition of Re590−Re550≧10nm.

13. The phase-retarder as defined in claim 11, wherein the cellulose ester film is made of cellulose acetate having an acetic acid content of 45.0 to 62.5%.

14. The phase retarder as defined in claim 11, wherein at least one of the at least two aromatic rings is a 1,3,5-triazine ring.

15. The phase retarder as defined in claim 11, wherein the cellulose ester film contains the aromatic compound having at least two aromatic rings in an amount of 0.05 to 20 weight parts based on 100 weight parts of the cellulose ester.

16. The phase retarder as defined in claim 11, wherein a refractive index of the cellulose ester film represented by nx measured along a slow axis of the film in plane, a refractive index of the film reputed by ny measured along a direction perpendicular to the slow axis in plane and the refractive index of the film represented by nz along a thickness direction of the film satisfy the formula of $1 \leq (nx-nz)(nx-ny) \leq 2$.

17. The phase retarder as defined in claim 16, wherein the cellulose ester film is a stretched film.

18. The phase retarder as defined in claim 17, wherein the cellulose ester film is so stretched that the maximum stretch ratio represented by SA and a stretch ratio represented by SB measured along a direction perpendicular to the direction of SA satisfy the condition of $1 < SA/SB \leq 3$.

* * * * *

UNITED STATES PATENT AND TRADEMARK OFFICE
CERTIFICATE OF CORRECTION

PATENT NO. : 7,166,339 B1
APPLICATION NO. : 09/959128
DATED : January 23, 2007
INVENTOR(S) : Hiroyuki Mori et al.

It is certified that error appears in the above-identified patent and that said Letters Patent is hereby corrected as shown below:

Title Page; Item --(73) add Assignee: Fuji Photo Film Co., Ltd., Minami-Ashigara (JP)--

Signed and Sealed this

Twenty-fifth Day of December, 2007

JON W. DUDAS
*Director of the United States Patent and Trademark Office*